United States Patent
Bennett

(10) Patent No.: US 10,754,769 B2
(45) Date of Patent: *Aug. 25, 2020

(54) MEMORY SYSTEM HAVING PERSISTENT GARBAGE COLLECTION

(71) Applicant: VIOLIN SYSTEMS LLC, San Jose, CA (US)

(72) Inventor: Jon C. R. Bennett, Sufbury, MA (US)

(73) Assignee: VIOLIN SYSTEMS LLC, San Jose, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/232,945

(22) Filed: Dec. 26, 2018

(65) Prior Publication Data

US 2019/0129842 A1 May 2, 2019

Related U.S. Application Data

(63) Continuation of application No. 16/052,513, filed on Aug. 1, 2018, now Pat. No. 10,204,042, which is a
(Continued)

(51) Int. Cl.
*G06F 12/00* (2006.01)
*G06F 12/02* (2006.01)

(52) U.S. Cl.
CPC .. *G06F 12/0246* (2013.01); *G06F 2212/7205* (2013.01)

(58) Field of Classification Search
CPC .................. G06F 12/0246; G06F 2212/7205
See application file for complete search history.

(56) References Cited

U.S. PATENT DOCUMENTS

| 4,363,094 A | 12/1982 | Kaul |
| 4,843,288 A | 6/1989 | Volz |

(Continued)

FOREIGN PATENT DOCUMENTS

| CN | 1551244 A | 12/2004 |
| CN | 1625781 A | 6/2005 |

(Continued)

OTHER PUBLICATIONS

Rosenblum, Mendel et al., The Design and Implementation of a Log-Structured File System,: ACM Transactions on Computer Systems, vol. 10, No. 1, Feb. 1992; pp. 26-52.
(Continued)

*Primary Examiner* — Gurtej Bansal
(74) *Attorney, Agent, or Firm* — Schwabe Williamson & Wyatt

(57) ABSTRACT

Non-volatile memory systems such as those using NAND FLASH technology have a property that a memory location can be written to only once prior to being erased, and a contiguous group of memory locations need to be erased simultaneously. The process of recovering space that is no longer being used for storage of current data, called garbage collection, may interfere with the rapid access to data in other memory locations of the memory system during the erase period. The effects of garbage collection on system performance may be mitigated by performing portions of the process contemporaneously with the user initiated reading and writing operations. The memory circuits and the data may also be configured such that the data is stored in stripes of a RAID array and the scheduling of the erase operations may be arranged so that the erase operations for garbage collection are hidden from the user operations.

13 Claims, 10 Drawing Sheets

Related U.S. Application Data continuation of application No. 12/796,836, filed on Jun. 9, 2010, now abandoned.

(60) Provisional application No. 61/186,626, filed on Jun. 12, 2009.

(56) References Cited

U.S. PATENT DOCUMENTS

| | | | |
|---|---|---|---|
| 5,128,810 A | 7/1992 | Halford | |
| 5,379,262 A | 1/1995 | Okamoto | |
| 5,687,183 A | 11/1997 | Chesley | |
| 5,974,503 A | 10/1999 | Venkatesh | |
| 6,009,547 A | 12/1999 | Jaquette | |
| 6,038,570 A | 3/2000 | Hitz | |
| 6,118,612 A | 9/2000 | Judd | |
| 6,151,289 A | 11/2000 | Rope | |
| 6,185,134 B1 | 2/2001 | Tanaka | |
| 6,205,571 B1 | 3/2001 | Camporese | |
| 6,226,708 B1 | 5/2001 | Mcgoldrick | |
| 6,237,052 B1 | 5/2001 | Stolowitz | |
| 6,321,345 B1 | 11/2001 | Mann | |
| 6,353,895 B1 | 3/2002 | Stephenson | |
| 6,374,337 B1 | 4/2002 | Estakhri | |
| 6,425,052 B1 | 7/2002 | Hashemi | |
| 6,539,463 B1 | 3/2003 | Kuwata | |
| 6,567,311 B2 | 5/2003 | Ishii | |
| 6,581,185 B1 | 6/2003 | Hughes | |
| 6,591,339 B1 | 7/2003 | Horst | |
| 6,763,424 B2 | 7/2004 | Conley | |
| 7,111,140 B2 | 9/2006 | Estakhri | |
| 7,136,964 B2 | 11/2006 | Yamamoto | |
| 7,143,305 B2 | 11/2006 | Hajji | |
| 7,149,950 B2 | 12/2006 | Spencer | |
| 7,191,304 B1 | 3/2007 | Cameron | |
| 7,203,889 B2 | 4/2007 | Oza | |
| 7,213,103 B2 | 5/2007 | Eng | |
| 7,310,703 B2 | 12/2007 | Frolund | |
| 7,356,730 B2 | 4/2008 | Ulrich | |
| 7,363,455 B2 | 4/2008 | Shimada | |
| 7,366,852 B2 | 4/2008 | Hung | |
| 7,451,265 B2 | 11/2008 | Traister | |
| RE40,877 E | 1/2009 | Singhal | |
| 7,734,867 B1 | 6/2010 | Keeton | |
| 7,818,525 B1 | 10/2010 | Frost | |
| 7,984,084 B2 | 7/2011 | Sinclair | |
| 10,204,042 B2 | 2/2019 | Bennett | |
| 2002/0046322 A1 | 4/2002 | Butterworth | |
| 2002/0073285 A1 | 6/2002 | Butterworth | |
| 2002/0083379 A1 | 6/2002 | Nishikawa | |
| 2002/0099904 A1 | 7/2002 | Conley | |
| 2002/0103966 A1 | 8/2002 | Wu | |
| 2002/0120901 A1 | 8/2002 | Poirier | |
| 2003/0046489 A1 | 3/2003 | Yagi | |
| 2003/0065876 A1 | 4/2003 | Lasser | |
| 2003/0084397 A1 | 5/2003 | Peleg | |
| 2003/0097524 A1 | 5/2003 | Brant | |
| 2003/0105928 A1 | 6/2003 | Ash | |
| 2003/0110343 A1 | 6/2003 | Hagiwara | |
| 2003/0208511 A1 | 11/2003 | Earl | |
| 2003/0212858 A1 | 11/2003 | Apperley | |
| 2004/0073767 A1 | 4/2004 | Johnson | |
| 2004/0153817 A1 | 8/2004 | Norman | |
| 2004/0153902 A1 | 8/2004 | Machado | |
| 2005/0015522 A1 | 1/2005 | Elboim | |
| 2005/0044313 A1 | 2/2005 | Amemiya | |
| 2005/0111249 A1 | 5/2005 | Yagisawa | |
| 2005/0144365 A1 | 6/2005 | Gorobets | |
| 2005/0146929 A1 | 7/2005 | Conley | |
| 2005/0193166 A1 | 9/2005 | Johnson | |
| 2005/0223269 A1 | 10/2005 | Stolowitz | |
| 2005/0240743 A1 | 10/2005 | Eng | |
| 2005/0246362 A1 | 11/2005 | Borland | |
| 2005/0279837 A1 | 12/2005 | Hajji | |
| 2006/0064545 A1 | 3/2006 | Wintergerst | |
| 2006/0161678 A1 | 7/2006 | Bopardikar | |
| 2006/0187715 A1 | 8/2006 | Narvaez | |
| 2006/0271725 A1 | 11/2006 | Wong | |
| 2007/0061513 A1 | 3/2007 | Tsumagari | |
| 2007/0079219 A1 | 4/2007 | Nagai | |
| 2007/0088754 A1 | 4/2007 | Brannon | |
| 2007/0089045 A1 | 4/2007 | Corbett | |
| 2007/0101075 A1 | 5/2007 | Jeddeloh | |
| 2007/0113029 A1 | 5/2007 | Bennett | |
| 2007/0124532 A1 | 5/2007 | Bennett | |
| 2007/0162516 A1 | 7/2007 | Thiel | |
| 2007/0279993 A1 | 12/2007 | Hemink | |
| 2008/0052446 A1 | 2/2008 | Lasser | |
| 2008/0059703 A1 | 3/2008 | Yoshioka | |
| 2008/0059869 A1 | 3/2008 | Brewer | |
| 2008/0089135 A1 | 4/2008 | Ito | |
| 2008/0098054 A1 | 4/2008 | Carmody | |
| 2008/0098192 A1 | 4/2008 | Im | |
| 2008/0109616 A1 | 5/2008 | Taylor | |
| 2008/0126673 A1 | 5/2008 | Kaneda | |
| 2008/0155160 A1 | 6/2008 | McDaniel | |
| 2008/0168304 A1 | 7/2008 | Flynn | |
| 2008/0250270 A1 | 10/2008 | Bennett | |
| 2008/0282025 A1 | 11/2008 | Biswas | |
| 2008/0316822 A1 | 12/2008 | Ahn | |
| 2008/0320366 A1 | 12/2008 | Lin | |
| 2009/0006886 A1 | 1/2009 | Oconnor | |
| 2009/0010067 A1 | 1/2009 | Lee | |
| 2009/0089045 A1 | 4/2009 | Lenat | |
| 2009/0106491 A1 | 4/2009 | Piszczek | |
| 2009/0132778 A1* | 5/2009 | Danilak | G06F 11/008 711/167 |
| 2009/0147573 A1 | 6/2009 | Hemink | |
| 2009/0150599 A1 | 6/2009 | Bennett | |
| 2009/0172250 A1 | 7/2009 | Allen | |
| 2009/0172258 A1 | 7/2009 | Olbrich | |
| 2009/0172335 A1 | 7/2009 | Kulkarni | |
| 2009/0198947 A1 | 8/2009 | Khmelnitsky | |
| 2009/0204872 A1 | 8/2009 | Yu | |
| 2010/0023672 A1* | 1/2010 | Gorobets | G06F 12/0246 711/103 |
| 2010/0115189 A1 | 5/2010 | Lin | |
| 2010/0293440 A1* | 11/2010 | Thatcher | G06F 11/073 714/764 |
| 2010/0325351 A1 | 12/2010 | Bennett | |
| 2011/0099320 A1 | 4/2011 | Lucas | |
| 2018/0373627 A1 | 12/2018 | Bennett | |

FOREIGN PATENT DOCUMENTS

| | | |
|---|---|---|
| CN | 102576330 A | 7/2012 |
| EP | 977121 A2 | 2/2000 |
| EP | 2441004 A2 | 4/2012 |
| JP | 09-265357 A | 10/1997 |
| JP | 2003-30993 A | 1/2003 |
| KR | 10-1324688 B1 | 11/2013 |
| WO | 2010144587 A2 | 12/2010 |

OTHER PUBLICATIONS

Chen, P. M., et al., "Maximizing Performance in a Striped Disk Array," Computer Science Division, University of California, Berkeley, 10 pages.

Samsung Electronics Flash Memory, '1 G x 8 Bit/ 2G x 8 Bit/ 4G x Bit NANO Flash Memory, K9 XXG08UXA, Date Unknown, 50 pages.

NXP Corp "LPX122 x," datasheet, cited by Examiner in U.S. Appl. No. 12/079,346, filed Mar. 26, 2008, undated, p. 44 of 60, 2 pages.

Written Opinion of the International Searching Authority from the International Search Report from PCT application No. PCT/US2008/083969 dated Apr. 30, 2009, 5 pages.

Extended European Search Report for European Application No. 10786789.7, dated Nov. 22, 2012, 6 pages.

Graefe, F, "Write-Optimized B-Trees," Proceeding of the 30th VLDB Conference, 2004, Toronto, Canada, pp. 672-683.

Jeffrey, C, "Performance Analysis of Dynamic Sparing and Error Correction Techniques for Fault Tolerance in Nanoscale Memory

(56) References Cited

OTHER PUBLICATIONS

Structures", Thesis Presentation, University of Florida, 2004, 104 pages.
Juonolainen, M, "Cand Scient Thesis", University of Oslo, Department of Informatics, 1999, 129 pages.
N0rvag, Kjetil et al., "Log-Only Temporal Object Storage", IEEE, published in the proceedings of DEXA '97, France, 1997, 6 pages.
Shirriff, Kenneth William, "Sawmill: A Logging File System for a High Performance RAID Disk Array", Dissertation Presentation, University of California, Berkeley, 1995, 162 pages.
Unknown author, "Spike Free Low Latency," obtained from Internet, www.vmem.com, © 2011, Violin Memory, Inc., 8 pages.
Chang, L., et al., "Real-Time Garbage Collection for Flash-Memory Storage Systems of Real-Time Embedded Systems," ACM Transactions on Embedded Computing Systems, vol. V, No. N, Jun. 2004, pp. 1-26, © 2004 ACM 1529-3785/2004/0700-0001.
Chaudhuri, S., et al., "Real-Time Access Guarantees for NAND Flash Using Partial Block Cleaning," SEUS 2008, LNCS 5287, pp. 138-149, 2008. © IFIP International Federation for Information Processing 2008.
Chaudhuri, S., "Deterministic Service Guarantees for NAND Flash using Partial Block Cleaning," CODES+ISSSI08, Oct. 19-24, 2008, Atlanta, Georgia, USA. Copyright 2008 ACM ._,vn 978-1-60558-470-6/08/10, pp. 19-24.
Chang, L.P., et al., "Real-Time Garbage Collection for Flash-Memory Storage Systems of Real-Time Embedded Systems," ACM Transactions on Embedded Computing Systems, vol. V, No. N, Jun. 2004, pp. 1-26, pp. 1-26.
Chen P. M. et al. "Maximizing Performance in a StriDed Disk Array" ComDuter Science Division, University of California, Berkeley, 10 pages.
"Choudhuri, DD. S., et al., October ""Deterministic 19-24, 2008, Service Atlanta, Guarantees Georgia, for USA, NANO Copyright Flash using 2008 Partial ACM Block 978-1-60558-470-Cleaning,""" Apr. 8, 2010, CODES+ISSS\08, 19-24.".
"Choudhuri, 2008, S., et LNCS al., 5287, ""Real-Time pp. 138-149, Access 2008, Guarantees © IFIP for International NANO Flash Federation Using for Partial Information Block Cleaning,""" Processing 2008.SEUS".
Intel, 'Understanding the Flash Translation Layer (FTL) Specification,' Dec. 1998, Order No. 297816-002, Copyright Intel Corporation 1997, 1998, DD. 1-20.
Intel®, "Intelligent RAID 6 Theory Overview and Implementation," www.intel.com/design/storage/intelligent_raid.htm, Copyright 2005 Intel Corporation, 13 pages.
Patterson, D. A., the et al., ACM ""A Case SIGMOD for Redundant International Arrays Conference of on Inexpensive Management Disks of (RAID),"" Data, pp. Reprint 109-116, from June.
PCT Notification of Transmittal of the International Search Report and the Written Opinion of the International Searching Authority, or the Declaration for International Application No. PCT/US2010/037987, dated Dec. 30, 2010, 9 pages.
Sanders, D.A., et al., "Terabyte IDE RAID-5 Disk Arrays," 2003 Conference for Computing in High Energy and Nuclear Physics, LaJolla, California, Mar. 24-28, 2003, pp. 1-8.

\* cited by examiner

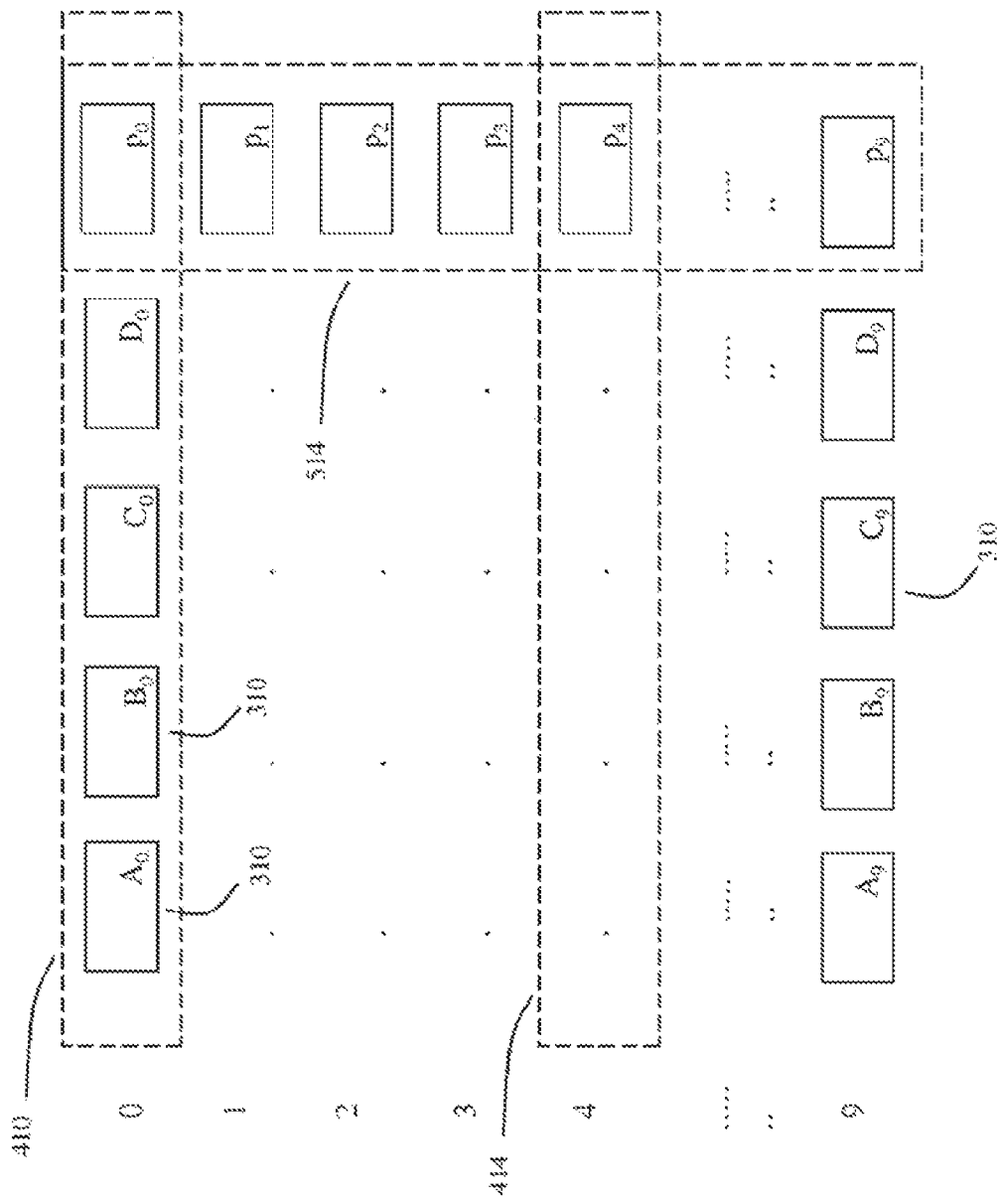

FIG. 10B

MEMORY SYSTEM HAVING PERSISTENT GARBAGE COLLECTION

The present application is a continuation of U.S. application Serial No. 16/052,513, filed Aug. 1, 2018, which is a continuation of U.S. application Ser. No. 12/796,836, filed Jun. 9, 2010 which claims the benefit of priority to U.S. Provisional Application No. 61/186,626 filed Jun. 12, 2009, all of which are incorporated herein by reference in their entireties.

TECHNICAL FIELD

This application may relate to the storage of data or instructions for use by a computer.

BACKGROUND

Non-volatile storage devices (NVS), such as flash memory, may be used for the storage of data in computing system applications. There are currently two types of flash memory in general use, with other types being developed. NOR flash and NAND flash have differing write and read speeds, differing lifetimes, and costs. NAND flash is preferred at present for large memory systems. The architecture of a NAND flash memory system is influenced, in part, by the desire to replace rotating media (e.g., magnetic disks) or tape as a bulk storage device. A characteristic of a flash memory device is that the organization of the memory locations may emulate a sector, page, and volume of a disk. However, there are certain differences in the implementing technology which need to be accommodated. In particular, whereas a disk sector may be written to multiple times in succession, a sector of flash memory may be written to once. Prior to another write operation, the sector must be erased. However, the minimum size of the memory area that may be erased may be large when compared with a sector or a page. This minimum sized area of physical memory that is erasable is termed a "block", and is a plurality of contiguous pages which may have a definite relationship to the chip electrical construction.

To perform an elemental write operation on a previously unwritten page, the page of data may be written to directly to the memory area. This is sometimes called programming, and selectively sets bits of the page to "0" from the previous "1" state so as to record the data. When the data in the page location needs to be modified, the modification cannot be performed in place, unless all of the bits of the page are first set all to "1" again, which is an operation termed "erase". But erase operations cannot be performed on a territory area smaller than a block, which may be, for example 128 pages. So, in order to write one byte, the memory controller may have to read 128 pages, erase the block, and write all of the data, including the modified byte, back to the memory area. This is inefficient. As well, the number of erase operations is high, and one aspect of flash product lifetime is the number of erase operations which may be performed prior to device wear out.

A more efficient approach is to read the page to be modified (a "live" or "active" page, containing valid current data) make the data modification in local volatile memory, and write the modified page data to a free page. A "free" page is one which has never been programmed, or has been erased as part of a block erase operation. After the write operation, the free page becomes an active page, and the page that has been read from is now out-of-date, and is called a "dead" page, or a "stale" page.

Another limitation of currently used NAND flash is that the pages of a block need are written in sequential order beginning with the first page, so as to minimize write-disturb errors. Any blocks not written to in this order would remain free until the block is again erased. As this wastes storage space, the usual policy is to write to each page of a block in sequential order, although the writing need not be time continuous. Data at the original location of the page being modified is left in place in the memory, as pages cannot be individually erased. So, a dead or stale page of memory is out-of-date, and not longer of use, but still occupied memory space. Eventually, the memory would become filled with a combination of active and dead pages, and all of the free pages would be exhausted.

SUMMARY

A non-volatile data storage system is described, the storage system having a memory module with a plurality of non-volatile memory circuits (NVS) each NVS configurable into a first memory area and a second memory area. Each of the first and the second memory areas has storage locations for data, and each of the storage locations is writable once unless the locations are subsequently erased.

The memory module is configurable such that each storage location has a status of one of active, dead, or free, and when all of the storage locations of the first memory area of a NVS of the plurality of NVS are either service or dead, and data stored in an active storage location of the first memory area is modified, the memory module is configurable to move data from at least one other active storage location of the memory module to a free storage location not in the first memory area.

In an aspect, a method of managing data in a flash memory system, includes, allocating a block of flash memory of a flash memory circuit to a first memory are and a second memory area, each of the memory areas having a plurality of pages for storing data. Data is written to a page of the first memory area of a block. Data on a page is modified by writing the modified data to a free page of the block, or to another block having a free page; and, for the condition that the plurality of pages of the first memory area are all either active or dead; moving data of at least one additional active page from the first memory are to a free page not in the first memory area.

In another aspect, a computer program product, stored or distributed on or in a computer readable medium, has instructions for configuring a processor in communication with a flash memory circuit to perform a method of: allocating free pages of a block of the flash memory circuit to a first memory area and a second memory area; writing data to a free page of the first memory area and designating the page as an active page; moving the data of the active page to a free page not in the first memory area, and designating the active page as a dead page; determining whether all pages of the first memory area are designated as either active or dead ages; and for each additional page designated as a dead page; moving data of at least one additional active page from the first memory are not a free page not in the first memory area.

In yet another aspect, a non-volatile data storage system includes a memory module having plurality of none-volatile memory circuits (NVS) each NVS circuit configurable into a first memory area and a second memory area, each of the first and the second memory areas having a plurality storage locations for data. A memory circuit of the plurality of memory circuits is further configurable such that a storage location of the plurality of storage locations of the memory circuit is characterized as having a status of one of live, dead, or free and, prior to all of the storage locations of the first memory area being characterized as being either live or dead, a processor of the memory module is configurable to move data from at least one active storage location in the first memory area of the memory circuit to a free storage location not in the first memory area.

BRIEF DESCRIPTION OF THE DRAWING

FIG. 9 is a schematic arrangement of the data in a RAID memory; and

DETAILED DESCRIPTION

Figure 1:
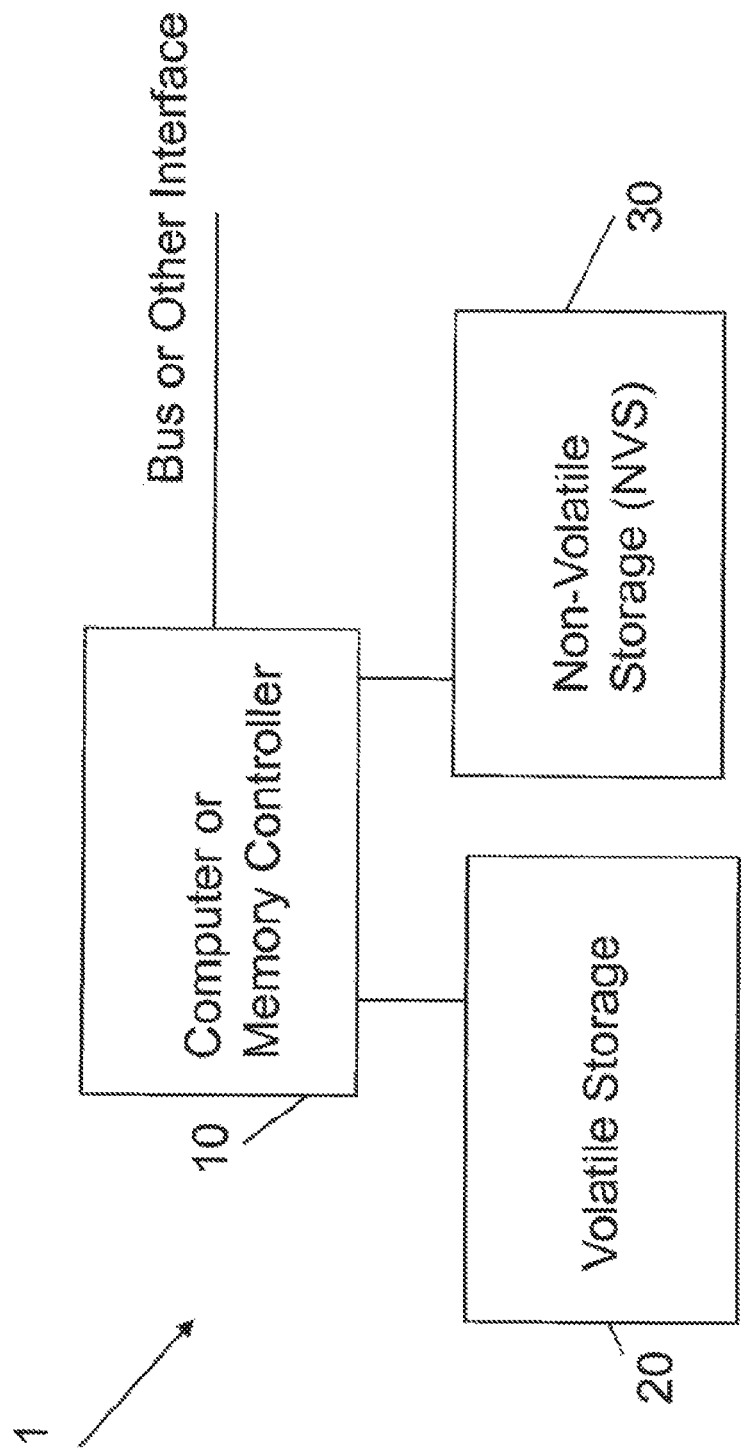
FIG. 1 illustrates a data storage system having volatile and non-volatile storage circuits.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

Reference may be made in this application to systems, apparatus, components, or techniques that are known, so as to enable a person of ordinary skill in the art to be able to comprehend the examples disclosed in the specification. The examples are intended to enable a person of ordinary skill in the art to practice the inventive concepts as claimed herein, using systems, apparatus, components, or techniques that may be known, disclosed herein, or hereafter developed, or combinations thereof. Where a comparison of performance is made between the examples disclosed wherein and any known system, apparatus, component, or technique, such comparison is made solely to permit a person of skill in the art to more conveniently understand the present novel system, apparatus, component, or technique, and it should be understood that, in complex system, various configurations and conditions may exist where eth comparisons made may be better, worse, or substantially the same, without implying that such results are invariably obtained or constitute a limitation on the performance which may be obtained.

It will be appreciated that the methods described and the apparatus shown in the figures may be configured or embodied in machine-executable instructions, e.g., software, or in hardware, or in a combination of both. The instructions can be used to cause a general-purpose computer, a microprocessor, a special-purpose processor, such as a DSP or array processor, or the like, that is programmed with the instructions to perform the operations described. Alternatively, the operations might be performed by specific hardware components that contain hardwired logic or firmware instructions for performing the operations described, or by any combination of programmed computer components and custom hardware components, which may include analog circuits. Such hardware components may include field programmable gate arrays (FPGA), application specific integrated circuits (ASIC), mixed logic and analog circuits, and the like. Where a computing device is described herein, the device is presumed to have any memory for the data and programs that are being used, or access to such memory.

The methods may be provided, at least in part, as a computer program product that may include a machine-readable medium having stored thereon instructions which may be used to cause a computer (or other electronic device) to perform the methods. for the purposes of this specification, the terms "machine-readable medium" shall be taken to include any medium that is capable of storing or encoding a sequence of instructions or data for execution by a computing machine or special-purpose hardware and that cause the machine or special purpose hardware to perform any one of the methodologies or functions of the present invention. the term "machine-readable medium" shall accordingly be taken include, but not be limited to, solid-state memories, optical and magnetic disks, magnetic memories, and optical memories.

For example, but not by way of limitation, a machine readable medium may include read-only memory (ROM); random access memory (RAM) of all types (e.g., S-RAM, D-RAM, P-RAM, M-RAM); programmable read only memory (PROM); electronically alterable read only memory (EPROM); magnetic random access memory; magnetic disk storage media; and, flash memory.

The machine readable medium may be a memory circuit that is an electronic product capable of storing data in volatile or non-volatile form depending on the technology employed. Such circuits may include a plurality of semiconductor chips, and include both analog and digital circuit components to perform the basic operations needed for storage and retrieval of data, status determination, and the like, and may have additional circuits performing supporting or related functions.

Furthermore, it is common in the art to speak of software, in one form or another (e.g., program, procedure, process, application, module, algorithm or logic), as taking an action or causing a result. Such expressions are merely a convenient way of saying that execution of the software by a computer or equivalent device causes the processor of the computer or the equivalent device to perform an action or a produce a result, a representation of which may be stored in a memory location or be used to act on an external device or system, either locally or over a network, as is well known by persons skilled in the art.

When describing a particular example, the example may include a particular feature, structure, or characteristic, but every example may not necessarily include the particular feature, structure or characteristic. This should not be taken as a suggestion or implication that the features, structure or could not be combined, except when such a combination is explicitly excluded. When a particular aspect, feature, structure, or characteristic is described in connection with an example, a person skilled in the art may give effect to such feature, structure or characteristic in connection with other examples, whether or not explicitly set forth herein.

For the purposes of a first example, a memory system or memory module 1 may include the functional areas shown in FIG. 1, where the non-volatile storage (NVS) 30 is, for example, a flash memory, which may be a multi-chip device, the volatile memory 20, for example, is DRAM, and the computer 10 is a microprocessor, field-programmable-gate-array (FPGA), state machine of the like, which itself may include local memory, which may include volatile and non-volatile memory, including memory for local storage of program data. Alternative, such program data may be loaded from another memory. The computer 10 may also include the circuitry for interfacing with data base, or have another form of interface to the remainder of the system. The hardware may be located on a single circuit board or substrate, or a plurality of the same.

An example of a non volatile storage device (NVS) device 30 is one or more 1 GByte (GB) flash memory packages. Samsung part number K9W8G08U1M, having two 512 MByte (MB) dies or chips in the same physical package. The device has a shared 8-bit I/O bits, and a number of shared control signals. The two dies have separate chip enable and ready/busy signals. the extension to memory devices of larger or smaller capacities and to multiple chip packages would be understood by a person of skill in the art. Multiple chips may be combined, stacked or otherwise arranged in an electronic package or assembly.

Figure 2:
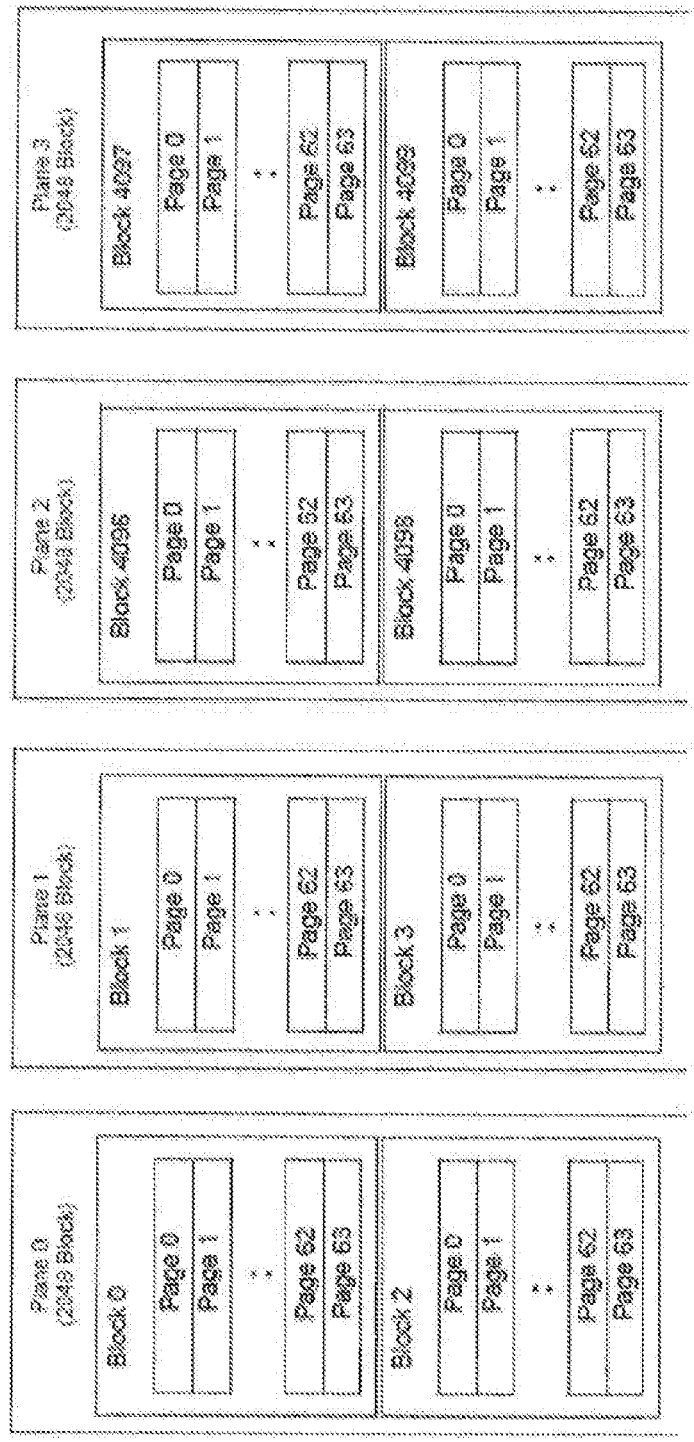
FIG. 2 is an example of a memory circuit organized as pages and blocks and representative of a chip of flash memory.

In another example, and not by way of any limitation, a non-volatile storage module may include from 8 to 16 flash package, each package having, for example, 8 flash chips or devices. A flash chip may have a capacity of 4 GB, so that 8 flash circuits (a package) would have a capacity of 1 GB and 16 flash packages would have a capacity of 128 GB. FIG. 2 shows a logical layout of two flash chips. The flash memory device may be characterized as having a programming time (write time) of 200 μsec typical and 700 μsec maximum, a page read time of 125 μs, and an erase time of 1.5 ms typical and 2 msec maximum. When the device has been commanded to perform an erase operation on a block, the device is in a "busy" state and is not capable of receiving or executing other operational commands, except for a reset or read status command. The devices are organized to communicate with the memory controller 10 over local busses having a capacity of 20 Mbytes/s for a total capacity of 160 Mbytes/s. The volatile memory may be DRAM, organized as 8 bits wide with a clock rate of 125 MHz.

Some of the limitations of the NAND FLASH chips presently in production are due to, for example, the use of multiplexed data busses, while others arise from the desire for backwards compatibility with exiting chips circuit board layouts and computer software as the density of the memory on each chip increases as a matter of technological evolution. However, one may apply the principled herein to any memory technology or arrangement were there is an asymmetry between the read time and the write time or the erase time.

Each die of an example flash chip may constrain 4096 blocks; each block may contain sixty four (64) 2 Kbyte pages with an organization of pages, for example, as shown in FIG. 2. That is, each die may have a capacity of 512 Mbytes (MB) and a package of two dies (which may be a chip) has a capacity of 1 Gbyte (GB). Each page may also be comprised of four (4) 512 byte sectors. Each page may further include a 64 byte region used to hold local metadata, which may be termed auxiliary data or spare data for the sectors. The data and metadata of a page may be arranged in various manners, with metadata for the entire page contained in one 64 byte region or allocated to sectors of the page.

In an example, stored data may be read by transferring an image of an entire page from the non-volatile memory into a 2 Kbyte+1 byte violate data register. The data thus read may be accessed from the register as random data, or the entire page shifted out over a data bus. A subset of the page may also be shifted out, since a read pointer may be positioned at an byte location in the page. Where the reading of a sector is described, the local metadata may also have also been read, should the metadata have been needed. The metadata may then be accessed without transferring the remaining data of the sector or page. Alternatively, where the reading of the sector metadata is described, the sector data may also have been read. For convenience in the explanation of the examples, the minimum size of a memory region to be read will be considered to be the page, as a person of skill in the art would understand the present description as being applicable, for example, to the reading or writing of a sector. However, some comments on the reading of sectors are made herein, where timing considerations may be of interest.

Reading a page from the non-volatile memory circuits into the data register may take 25 μsec, and the data may be shifted out to the chip data bus at a rate of 20 MB/s. Shifting an entire page to the chip data bus requires about 100 μsec. Where only the auxiliary data is needed, the read time may be reduced to approximately the 25 μsec needed to read the data for a page into the data register. Before new or modified data can be written to a previously used location of a block, the block must be erased, a process which may take about 2 msec. Erasing sets all bits in the block to "1", and subsequent write (programming) operations selectively clear bits to "0". Once a bit is "0", the bit may be again set to "1" by erasing the entire block.

Writing (also called programming) may be carried out by shifting data into the chip data register and then executing a command that writes the data into the non-volatile memory circuit; writes take about 200 μsec or more. The write time and the erase times of a FLASH memory circuit may depend on the state of wear of the device. That is, while a new memory device may have a write time of 200 μsec, as the memory circuit experiences data write operations and block erase operations, the time needed to successfully perform an erase operation tends to increase and the time to perform a write tends to decrease. For convenience, the typical performance of a new device is used, but the actual times taken for the operations would be understood as the achieved performance. Where a write or erase interval is discussed herein, a fixed value accommodating the maximum time of a write or erase operation may be chosen for convenience. This should not preclude the use of variable values for these times based on measured data.

Using presently available production NAND FLASH memory packages, the data and metadata area of a page can each be written up to four times between erasures for single level cell (SLC) flash memory, while for multi-level cell (MLC) flash memory a page can only be written once between erase operations. That is, each of the sectors of the page may be separately written in increasing sequence order for SLC FLASH, while for the present generation of MLC FLASH all the sectors of a page must be written at the same time. This aspect of SLC permits the page to be divided into four independent 512 type sectors, and each sector may have an associated ECC, or other local metadata. The pages of SLC or MLC in a block are written sequentially, from low page addresses to high page addresses. A memory address of a page may be described by the sequential page number in the block, the sector number in the block and may include the location of a byte within a sector, if needed. Once a page has been written, earlier pages in the block may no longer be written (programmed) until after the next erasure of the entire block.

Before a block containing data that is valid or "live" can be erased, the valid data must first be moved to a location that is not going to be erased by the erase operation to be performed. When an entire block comprising 64 pages is read out so as to be moved to another memory location, about 64×100 μsec=6.4 msec is needed to read the pages of block to the external bus, and about 12.8 msec to write the block to another location. The originating block may then be erased, taking about an additional 2 msec, for a total of about 20.2 msec. If the originating and target blocks are on different flash dies of a package, or the flash die is capable of reading and writing to different blocks of the same time, then the reading, writing and erasing operations can be overlapped to some degree. Since the block may be comprised of a mixture of live and dead pages rather than all pages being live, the time to erase a block so the block can be placed in a pool of free (erased) blocks is not a constant. If only one page in the block is live, then about 100 μsec+200 μsec+=2.3 msec should be the minimum time to perform this operation. Conversely, if there is only one dead sector in the block, reclaiming a block takes approximately 19.9 msec. Either section would result in only one additional dree page being created in the overall user memory. So, the percentage of "dead" pages in a block affects at least the temporal efficiency of the garbage collection operation.

The use of the terms sector, page, and block in die previous discussion reflects the current commonly accepted terminology for flash memory circuits, and resulted from the adoption of several terms from rotating disk memory technology. Where data structures are described herein, the term block may have a different meaning, which is made clear in the subsequent discussion. The terms page and sector may be replaced by other terminology that is used when referring to data and the location thereof. This should be clear from the context. a person of skill in the art will understand when other equivalent terms are used.

With the continued evolution of non-volatile memory technology, changes in the organization and operation of memory circuits may occur, and new terminology may be employed to describe the situation; however, a person of skill in the art will be able to apply the concepts and teachings of this application to analogous problems in the use of such evolving technology.

The terms "garbage collection" and "wear leveling" are used to generically describe housekeeping operations that are performed in flash memory systems.

Garbage collection may relate to the processes of reclaiming "dead" memory locations created by the writing or re-writing of data to the FLASH memory. The old data location, representing a value of stored data that has been changed and stored in a new location, or relocated for other reasons, is out-of-date and represents washed space which needs to be reclaimed so that an appropriate amount of free memory is maintained to permit continued wire operations. Write operations continue to occur whenever the data in the memory is being modified by the user, or where additional data is being stored.

To prevent the memory from being filled (that is, to be in a state where there are no free pages) as a consequence of lost space associated with writing or modifying the data contents of FLASH memory locations, a housekeeping operation of "garbage collection" may be performed. The garbage collection process identifies the dead blocks, and in accordance with a pre-established policy, which may be in the form of machine readable instructions and parameters, the remaining live pages of the block are released from the block, so that the block is comprised entirely of dead pages, and the block may be erased and returned to a pool of free blocks.

Wear leveling generally relates to the processes of moving data in the FLASH memory so as to attempt to keep the number of block-erase operations approximately equal over the blocks of the memory, so as to avoid premature wear out of the FLASH memory. Presently, FLASH memory circuits are rated by manufacturers as having a lifetime which may be measured in the number of erase operations before failure. This is in addition to any conventional time-related failure-rate specification which may also be given. A failure may be a hard error, or a failure to perform wthin published or established operational characteristics, which may inlcude write and erase times, or excessive bit errors, as examples.

So, in addition to garbage colleciton, the relative number of erase operations that have been performed on each block of the memory device may be another factor in determining the policies for managing the FLASH memory. Since the wear-out of a flash memory device may be measurable in the number of erase operations performed thereon, with current typical lifetimes being specified as from between 100,000 and 1,000,000 erase operations for single-level-cell (SLC) NAND flash technology and 10,000 00 erase operations for multi-level-cell (MLC) NAND flash technology. The respective writing and erasing of a particular block of memory of the memory circuit, while other blocks may contain data that is infrequently modified and have few erase operations performed, may lead to premature wear-out unless the stage pattern is adjusted so as to substantially equalize the number of erase operations on the blocks of the physical memory circuit. This housekeeping process is called "wear leveling", and results in the selective movement of data pages which are not being frequently accessed by the user or the system processes.

Such non-user-related processes as garbage collection and wear leveling are often called housekeeping or "overhead" operations. The overhead may be manifest in variety of ways such as, a reduction in the memory capacity available to the user, a reduction in the rate of reading of data, a reduction of the rate of wiring of data, an increase in the latency between a read or a write request and the execution thereof, and the like. The variability of these performance indicators may be high, and unpredictable by the user application, and result in impaired user system performance.

The examples herein have generally been simplified by ignoring housekeeping and data protection operations such as wear leveling, bad-block detection and handling, error correction, and the like, which may be performed contemporaneously. In some instances, the interaction between the housekeeping operations, and the housekeeping operations and user-related operations is described for clarity, but this is not meant to be limitation.

Many of the housekeeping operations are manifest as movement of data to new sectors, erasing of blocks, changing a bad block table, maintenance of metadata such as the mapping tables, and the like. Some of these operations, such as wear leveling may be subsumed n the persistent garbage collection described herein by establishing suitable policies for the writing or relocation of pages when, for example, a modify operation is performed.

The term "block" is term used in computer technology having a variety of meanings, depending on the context in which it is used. In computer storage it is not uncommon to refer to data being stored or accessed in "blocks"which, while generally being of a fixed size, may not be the same as the "blocks" in FLASH memory. It is also not uncommon for the size, in bytes or some other measure, of the "block" of data being accessed or manipulated to be different for different entities operating on the same data. That is, the meaning of the term may depend on the perspective of the writer. For example, man operating systems manage the allocation of memory in DRAM in 4KB blocks, which are often called "pages", but DRAM is a different technology and this concept does not generally describe the organization of pages in FLASH memory. When data is written to a disk drive for storage, the block size may be 512 bytes, resulting in the 4 KB block of data being stored in 8 different 512-byte memory blocks on disk. The disk blocks are also commonly termed sectors, which is different from a FLASH memory sector. Such re-use of terminology is often found as the technology evolves, and a person of skill in the art would be able to understand the action, or phenomenon being described based on the context in which the terms are used.

When referring to the location in a memory system of a block of data one may refer to as Logical Block Address (LBA), which is how the location may be referred to in the context of a file management system, or its Physical Block Address (FBA) which is its actual storage location in the electronic memory system such as the FLASH memory. As with block sizes, different entities may use different types of addressing nomenclature and values to refer to the same piece of data. For example, an operating system may have a 4 KB block of data with logical address 5, assuming each address hold 4 KB of data, which it stores in DRAM at physical address 100. The operating system functions to maintain a mapping table which tracks the physical memory location address in which each logical address is stored. When the operating system acts to store that same data on a disk, the operating system may act to identify, for example, 8 unused 512 byte physical addresses, e.g., 8-15, in which to write the data. However, the disk drive controller itself may act store the data in the locations 8-15 on the disk, but may treat the addresses provided by the operating system file management software, for example, as logical addresses at the disk device level, and store the data in different physical addressed on the disks, which are tracked using a local mapping table. So the same piece of data, or a portion of a piece of data, or collection of pieces of data, may simultaneously be thought of as a block or a sector or a page, with addresses that may be thought of as being a physical address to which a logical address is mapped to by one entity, say the operating system, while actually being a logical address which is mapped to a physical address by yet another mapping table of a different entity, such as disk drive, FLASH memory module, or the like.

As a result we may speak of the user data having a logical block address (LBA), which a mapping table (MT) maps to a physical block address (PBA). However, the "block" may represent the data from a user viewpoint where the user, for example, writes data in 4 KB blocks but each FLASH device stores data in groups of data of 2 KBytes in length. One may say that, in this circumstance, the mapping table is really mapping logical "half block" addresses, to physical page addresses. In another aspect, if the FLASH was organized to store data in 1 KByte sequential chunks, this may constitute mapping logical "quarter" block addresses to physical "double sector" addresses; if 512 byte chunks, then 1/8 logical block to a single sector physical block. One appreciates that when the size of the user blocks is changed or the length of a FLASH page, or the like, is changed all the names of terms would have to correspondingly change. To avoid this, which is confusing, in presenting the concepts herein we use the terms LBA and PBA as the logical and physical locations of a piece of data, whose size is and location is context dependent.

Figure 3:
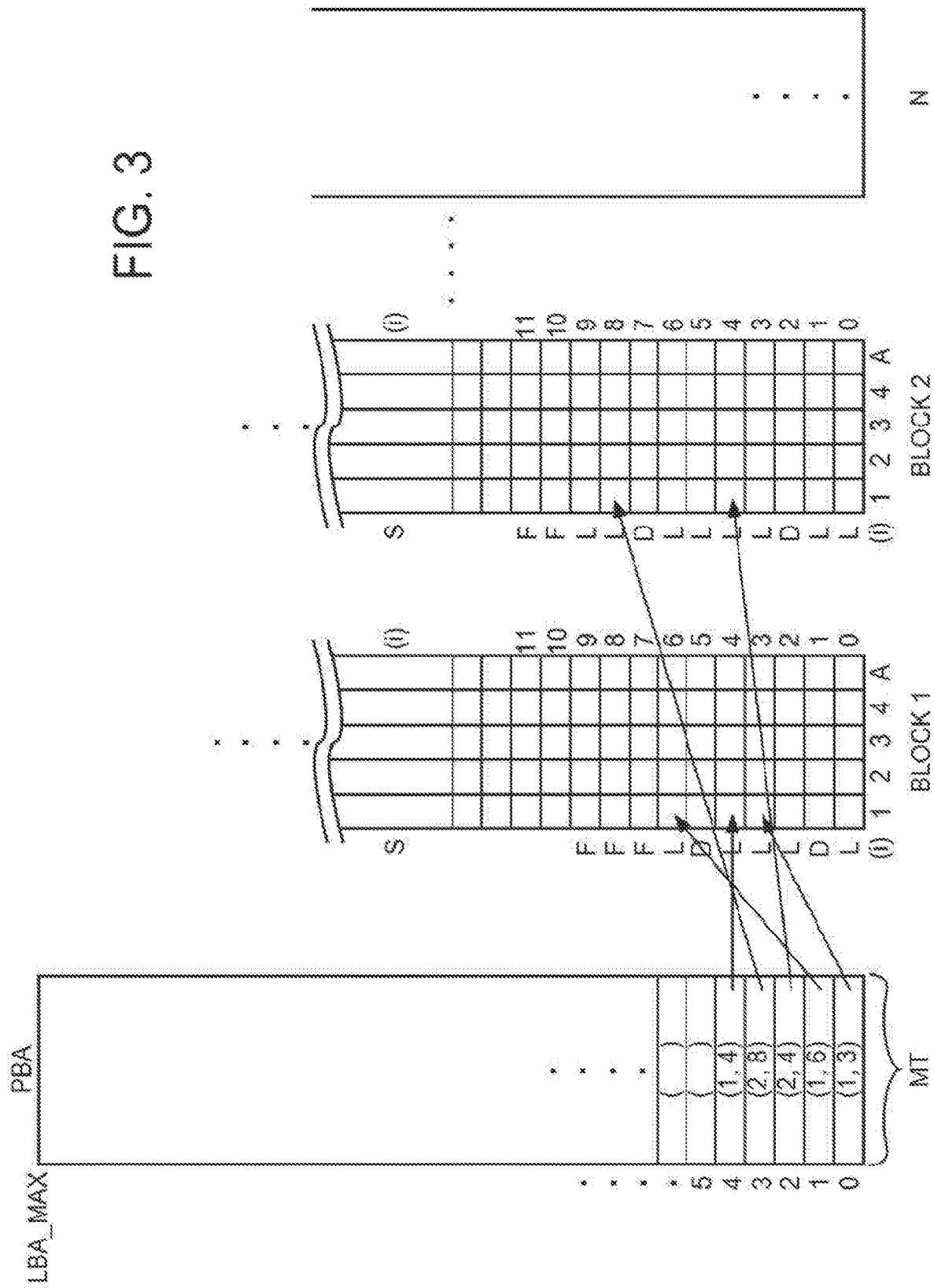
FIG. 3 illustrates the relationship of a mapping table between logical block addressed and physical block addresses, and corresponding page locations in blocks of a memory.

In an example, when a given LBA is written to the FLASH, say LBA 3, the data may be written to a free location, in this case as page 8 of block 2, as shown in FIG. 3. For simplicity we may treat the MT as a table in volatile memory, such as DRAM, large enough to score all the LBA to PBA mappings which can be directly referenced and updated. Many FLASH memory systems keep the LBA to PBA mappings in data structures other than flat tables, which may not be stored in volatile memory, so the form and location of the MT as described should not be taken as a limitation.

If LBA 3 is written to again, for example so as to update a value of data therein, then an available location in the FLASH memory device will be found to store the data a and the mapping table MT will be updated to refer to the new storage location. The physical location at which LBA 3 was previously located is new considered "dead,"; that is, the physical location cannot be used to store new data in that physical location, which may be, for example, a page until the block in which the page is located, in this example block 2, is erased. However, before block 2 can be erased any "live" data, in the form of LBAs that are mapped to PBAs located in block 2, such as LBA 2 which is mapped to the page 4 of block 2, must be relocated to a memory location in a different block so the live data is not lost when the block is erased. The processes of garbage collection and wear leveling may interact to some extent. Some of the policies associated with garbage collection may be adapted to perform some or all of the wear leveling functions as well.

For simplicity in discussion, the memory circuit may be a shirt, such as the Samsung part described above. The interface of the memory module on which the memory circuit is contained, with the reminder of a computing system, may be over a bus. The details of the management of user data, such as by a file management system, a block oriented storage system, or the like, are considered to be performed at a higher level in the system, so that, at some conceptual level of the memory module, principal function to be performed by the memory and the immediate interface to the memory is the reading of data or the writing of data. The modification of data in a memory location is considered to be a combination of read, modify and write operations.

The minimum-sized data element that is being considered in this example is a page, though the actual result of the operation to be performed may be intended to modify only one byte of the data stored in a 2 Kbyte page of a physical memory block have 64 pages in the block. Pages may be free, live ("active") or dead, depending on whether the bits therein have been erased and not yet programmed, programmed (written), or read for the purpose of modification and the modified data having been written to another free physical location while leaving the original data in place, respectively. Where the pages of a block are written using a policy of writing pages in increasing order, a free page is one which has a higher page number in the block than the highest page already programmed (live or dead) page. A free block is one in which all of the pages are free pages.

Of the entire available memory, a portion of the memory is available to the user, a portion is reserved for system housekeeping, and a portion may be unusable. The unusable memory area may be comprised of bad (defective) pages or bad blocks that have been identified, for example, by the manufacturer, or by the operating system. The criteria for determining a page or block to be "bad", may be different for each manufacturer or use, but the result of declaring a page or block "bad" is to remove the page block from the category of those blocks that are considered suitable for the reliable storage of data. Ultimately the number of bad blocks may grow sufficiently that insufficient memory is available for the user data and housekeeping activities and, effectively, the memory circuit device has failed or worn out.

For purposes of discussion, bad block are not considered, as they are not used or otherwise operated upon. They merely reduce the size of the memory available for use. Metadata, which is used to describe the location of the data and data properties on the physical memory, may also result in a reduction of the total memory available to the user. Such metadata may be about 2-5% of the size of the user data being stored. Herein, the metadata and the stored data are considered together as "data". The actual user data area would be reduced by the space needed to store the metadata, however as the storage of the data and metadata data may be managed by similar operations, discussion is simplified so as to consider that the operations performed on the user data and the local metadata would be the same or similar. As such, the "user" may be considered as the combination of commands and data provided to the memory controller by a user program, wherever located, and metadata maintenance related to the user metadata and housekeeping.

For this example, the user data, including user metadata, may be considered to be grouped in logical data blocks of 2 Kbytes, each such block having a logical block address (LBA). The LBAs may be considered to be numbered from LBA=0 to LBA=LBA_MAX, where LBA_MAX is the amount of user data memory available in a device, so that 2 KB×LBA_MAX is the user data memory size of a block. The user data area may be distributed over a plurality of physical memory blocks of the memory module, each memory block being, for example 256 Kbytes, and a memory module having many GB of memory.

For simplification we describe the case where the range of LBAs is limited to the size of available memory. Systems with address ranges larger or smaller than the size of available physical memory are not precluded.

A mapping table (MT), which may be part of the metadata, expresses the current association of an LBA with a physical memory location (PBL). An example of a MT is shown in FIG. 3. The PBL is the mapping of the LBA to a PBA (physical block address), which is the actual location of a page in the memory circuit. The number of PBL table entries may the same as the number of LBA table entries. This arises from the allocation, in this example, of an LBA to each logical page of the full extent of the available user memory.

Each LBA is an index to the array of PBAs, comprising a block number (i), and a page index (j) in the block (i). Not all of the LBAs are associated with live pages in the FLASH memory system. The table therefore associates each LBA with a specific physical location in a block of the FLASH memory where the page of data associated with the LBA is stored, or may associate the LBA with no physical location where data has not as yet been stored using the LBA, such as LAB 5 in FIG. 3, or has been de-allocated after being used.

Another attribute, which is shown conceptually at the left-hand side of the memory blocks, is the status of each page of the block. The pages may be free, live, or dead, as has been previously described. Note that is typical for all pages below the first free page to be either live or dead, as a bypassed free page should not be written to unless the entire block is erased. This is a property of currently available NAND flash memory devices, and is not otherwise intended as a limitation. The status of the pages may be stored as S(i,j). Further information on a block itself, may be stored in a variable B(i) (not shown) and include information such as the member of times that the block has been erased, whether the block is free, active, full or available for erase.

The available user memory may be smaller than the total amount of physical memory of the module. In particular, the additional physical memory may be used for housekeeping operations (and the other operations that are considered to be substituted in the term housekeeping, as they may not available to the user). So, for a memory module, having a total amount of physical memory (PM), and assuming that there is no provision for bad blocks, may be allocated a U bytes of user memory and H bytes of housekeeping memory where U+H=PM. That is, the PM represents 2 Kbytes× PBA_MAX. Sometimes, for convenience, the values of U and H are expressed as a percentage of the PM.

Initially, the memory module has no user data stored therein, when first used or completely erased. As the memory system is used to store, retrieve and modify data, the logical LBA are associated with user data to be stored having PBAs allocated in the MT, and the operations are performed thereon.

When a live data page described by an LBA is read, the operation is performed in place, as the data is not modified, and thus no write operation need be performed. The association of the LBA and PBA does not change in the MT. When a data page, described a LBA is written, a new PBA is selected from the pool of memory pages that are "free" where the data can be written to, and the MT entry for the LBA is updated with the new value of the PBA at which the data has been stored. This PBA now becomes a "live" page, and the status of the new live page is changed so that it is deleted from the pool of free pages. Concomitantly, the old PBA is now out of date, and is considered as a "dead" page. The page status is changed to be "dead" or "stale". The data of the dead page has not been modified, but the data is now of no current use (so long as the transaction has been properly accounted for, such as having the transaction operation successfully copied, by the system software).

An example of a data management system which may be suitable for this purpose is found in U.S. Ser. No. 12/273, 410, Method and System for Storage of Data in Non-Volatile Media, by the present inventor, filed on Nov. 18, 2009, which is incorporated herein by reference. The metadata associated with the user data and the maintenance thereof may be considered as part of the user data for purposes of this discussion.

Figure 4:
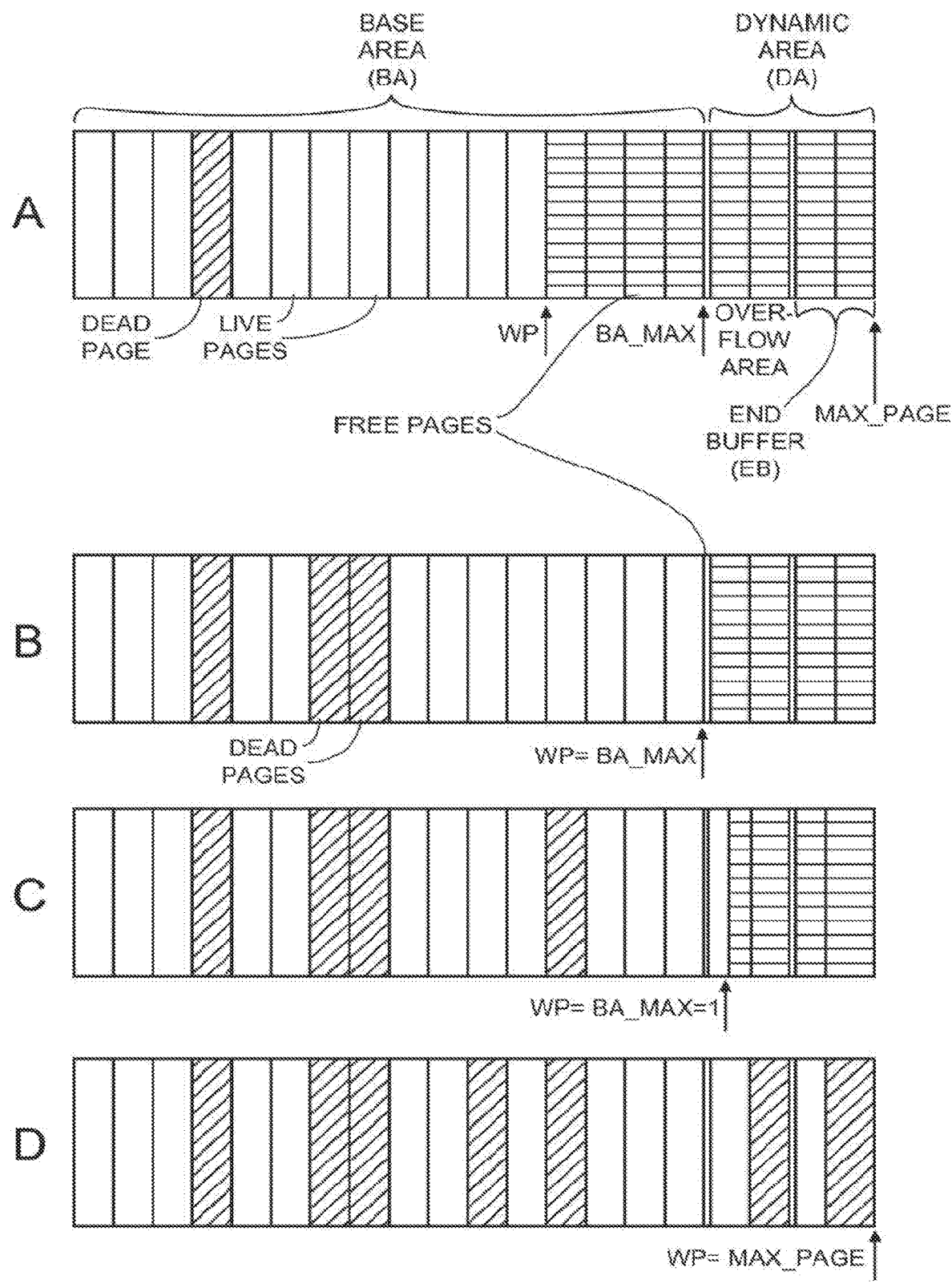
FIG. 4 conceptually illustrates the organization of a block of memory where: (A) the block is divided logically into a base area and an dynamic area, and free blocks are found in body areas; (B) the block ha no free pages in the base area; (C) the block has no free pages in the base area and some of the page sin the dynamic area are active pages; and (D) the block has no free pages.

FIG. 4 shows a simplified view of the storage area of a FLASH memory block (excluding spare data, bad pages, non-user-related housekeeping storage, and the like). FIG. 4A shows the data layout of a single memory block comprising MAX_PAGE pages of user memory. The value MAX_PAGE may vary from block-to-block, in practice, due to the number of bad blocks and the like; however, the total amount of user memory for the memory module is U of the total memory U+H.

In FIG. 3A, starting at the lowest PBA (0), data pages may be written to incrementally in sequential order up to a value of WP=PBA (i, MAX), which represents the results of MAX_page write operations, and WP is the value of a write pointer. Above PBA (i, MAX), which is the current value of WP, the memory pages have not as yet been written to, and are "free." The free pages have all been previously erased or pages that have never been written to are still all "1". All of the pages less than or equal to PBA (i, MAX), are live pages (ecept for one page in this example, which is presumed to have already been modified, and thus moved to antoher locaiton, and is shown as dead). The locations of the corresponding live pages are found in the MT.

For convenience in discussion, two contagious memory areas are defined; the base area (BA), and the dynamic area (DA). The dynamic area is further divided into an overflow area (OA) and an end buffer (EB). The value of the base area is U and the value of the dyanmic area is H.

The proportion of memory used as base area (BA) with respect to the dynamic area (DA) has an effect on system performance, which will be discussed later. For this example, the BA is 80% and the DA is 20%; the OA is 5% and the EB is 15%, where the percentages are of the total user memory of a physical memory block. The physical memory block is the smallest unit of memory that can be erased for the currently available NAND FLASH memories.

When the memory is first used, there is no data in any of the PBAs, and the PBAs become populated with data by writing each PBA with data associated with a LBA and related to the LBA through the MT. A write pointer WP (i, j) for each memory block is maintained. As shown in FIG. 3B, when the write pointer WP (i, j)=BA_MAX, the base area BA is full, and writing of further LBA page data to the memory module may continue in another memory block. During the operation of the user system, contemporaneously with the writing of data of LBAs to the memory for the first time, additional operations may occur, which have the effect of modifying an already written page of the block. A first such modified page was one where the data has been moved, as was shown in FIG. 3A, and is a dead page. The status of this page would be marked as S(i, j)=I). Further dead pages may be seen in FIG. 3B.

After sufficient operations to write or modify pages in the physical memory, all of the pages in of the BA of the block may either have been written to, and are "live", or may have been modified and are "dead," or some mixture of the states. There may be no free PBA in the BA of the blocks to accommodate the next write or modify data or housekeeping operation.

As this juncture, as shown in FIG. 4C, writing of user data to the dynamic area DA may occur (although there is no bar to beginning this portion of the process at an earlier time). This is described for a single block of the plurality of blocks and chips of a memory module. FIG. 4C shows the first write operation to the dynamic area DA which is made to PBA (i, WP)=BA_MAX+1, which is the lowest value physical memory page in the dynamic area DA. The writing of a page to the OA of the DA may also initiate move of page of data from the BA to another memory page location. Necessarily, this memory location is outside of the base are BA, as the base area is already filled and, in this instance, the page data may have been moved to the OA, or to another block. The location from which the page data was moved is now a dead page, as the data therein has been modified, or relocated, and is thus out-of-date. For each live page modified and written to the OA of the DA, an additional dead page may thus be created in the BA of the block. Live pages may be written to the DA as a result of modification of the data of the page, or as the result of housekeeping operations. In either circumstance, the source page is now considered to be a dead page.

Each time the data of an LBA is written to the OA, the WP is incremented by 1, and another page of data of the BA is moved elsewhere. Data from other pages in the BA, and page sin the OA may be moved as required by user and system needs, and each of these moves results in at least one dead page, increasing the percentage of dead pages in each block. At this juncture, the number of data move operations to the OA is at least equal to the number of write operations. The housekeeping load may be relatively small and distributed in time and with respect to the physical memory blocks.

By the time 5% of the memory in the OA block has been filled by moves related to data modification, another 5% of the data in the BA has also been relocated by the one-page-move-for-each-page-written policy, so that at least 10% of the overall user memory may be dead pages. Any other operations which modify stored data pages will also have also resulted in dead blocks, so that 10% dead blocks is a minimum value.

The data management operation may distribute the LBA writes to a plurality of blocks; however, here it is easier to explain the concept of operation if the LBA writes (including data modifies) are considered to be written sequentially to the present memory module. When the OA has been filled, PBA (i, WP)=OA_MAX, the first page PBA (i, WP)=OA_MAX+1 of the end buffer (EB) is written. Depending on the policy adopted, more than one additional page from the BA or the OA may now be relocated for each write of a LBA to the EB. For example, two pages of data in any of the BA or OA may relocated for every LBA write. In this instance the additional pages may be have been relocated to the EB. In general, they could have been relocated to other blocks or chips having free pages. This would include a free block. By the time that the free pages of the EB have been filled with physically relocated LBA page data, another 10% of the overall user memory on the memory block will have been converted from live pages to dead pages and the data relocated elsewhere. At this juncture, the block is effectively full and no more write operations can be performed to the block. However, if the additional, non-modified pages had been moved to another block, a total of at least 40% of the page sin the source memory block may be dead by the time that all of the pages in the source block are either live or dead.

A full block may be marked as a candidate for garbage collection (reclamation, erasure) or other housekeeping operations in accordance with a variety of policies which may be pursued. The percentage of dead pages, the number of times the block has been erased, and the like may be considered.

Figure 5:
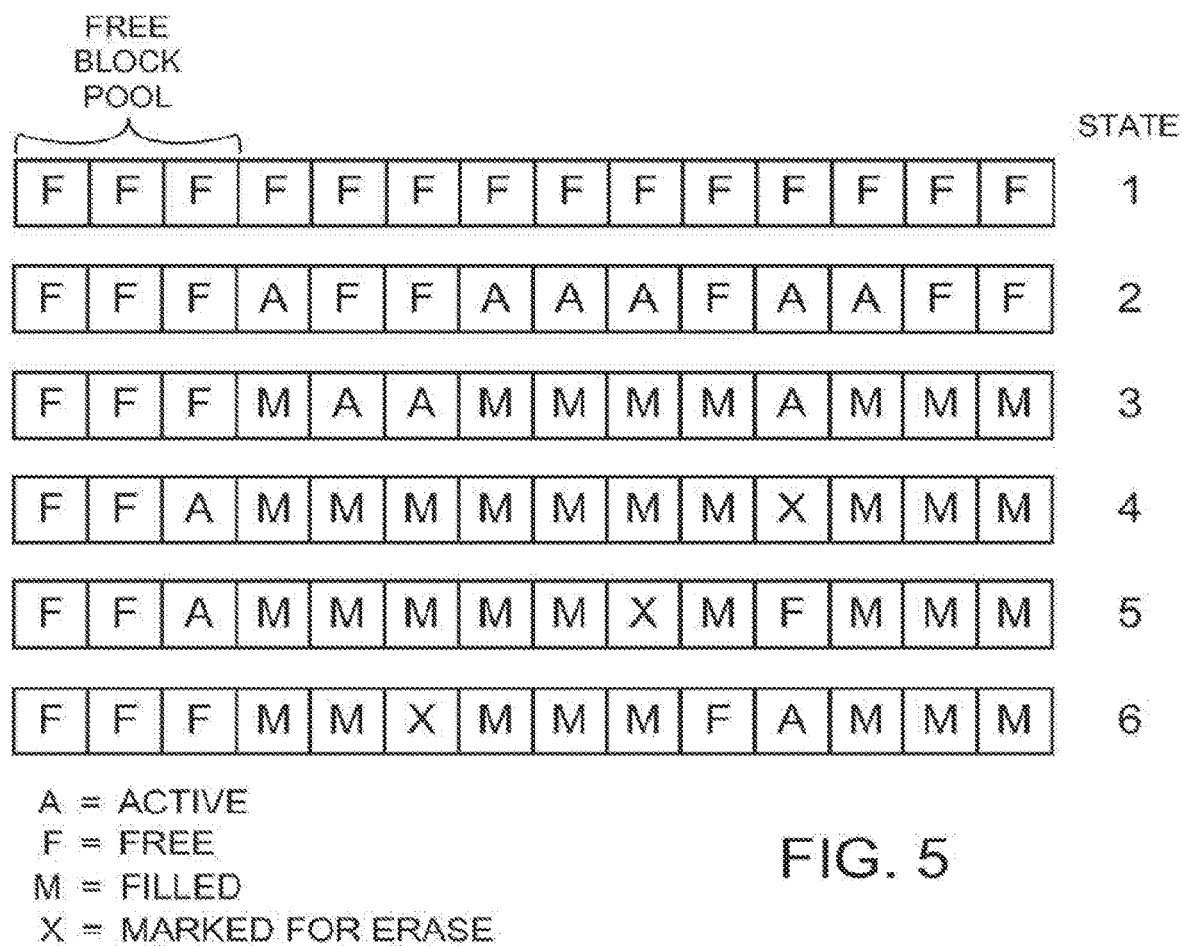
FIG. 5 conceptually illustrates a plurality of blocks of a memory circuit having different fill status.

At the chip or module level, the memory occupancy and management may be viewed somewhat differently, where the characteristics of blocks of memory are considered. As shown in FIG. 5, the blocks of memory on a chip, for example, may be thought of as an array of memory blocks, each having a size equal to the amount of memory available on the block. For convenience in discussion, this example presumes that the same number of memory pages is available on each block. However, as previously discussed, this may not always be true, and is not intended to be a limitation.

Blocks of memory, such as shown in FIG. 5, may have attributes of never been written to, or having been erased (free blocks) F, currently capable being written to and still having free pages available (active) A; and, having no free pages (full) M. In the latter case, each page of the bock is one of live or dead. Full blocks M have no more free page space available and cannot accept further writes without being reclaimed (erased). As described above, each full block may have data least about 40% or more dead pages. If the block is selected to be reclaimed (garbage collected), or marked for block erase X. In accordance with a policy, the remaining live pages in the marked block are first moved to other active blocks or free blocks prior to making the full block F as being available for an erase operation. The number of live pages may be less than 50 percent of the capacity of the block, as described above, and may be even less depending on dynamic system use. So, when a block is selected to be erased, the amount of data that needs to be moved may less than 50 percent of the situation which would have obtained if the block had been filled up without any corresponding in-process page relocation. However, this is not a limitation.

Furthermore, the data may be moved during interstices in the remaining operational actions rather than in a large group of pages immediately prior to the erasure of the block. That is, the number of page moves may be essentially the same, however, the page moves are made individually, and may be made interspersed with the user or housekeeping operations. As such, large and unpreidctable interruptions in the user data flow may be avoided.

Reclamation of physical memory blocks may be gated by the size of a free block pool. Where a sufficient number of free blocks are available, full blocks may not need to be explicitly reclaimed immediately. Such reclamation may be deferred until the number of free blocks in the free block pool is reduced to some threshold value. Where full blocks may not as yet been reclaimed, a background operation may be performed so as to move pages from full blocks to active or free blocks on an incremental basis, further increasing the number of dead blocks in the full block. In the limit, all of the pages may be dead, and the block may be erased or at least marked for erase when needed, without further page relocation.

The selection of full blocks from which to incrementally move pages may be governed by a policy where the number of erase operations previously experienced by the block is considered, and pages on blocks having lower erase counts may preferentially re-located. This is a form of wear leveling.

In another aspect, the example presented above may have the filling procedure of the OA modified. For example, the number of pages moved for each page written may be two. By the time that the OA becomes full, 30% of the pages would have been moved. By the time that the OA becomes full, at least 20+30%=50% of the block would comprise dead pages. If the number of pages moved were 3 for each LBA write, then at least 20+40%=60% of the pages would be dead by the time the block was full.

In yet another aspect, the dynamic area DA may be comprised of both the OA and the EB having the same relocation policy, so that the entire DA is treated as using the same policy. For example, tow pages may be relocated when a page is written to the DA for the purpose of a page data modification.

In still another aspect, the relocation policy may be variable, depending on factors such as the number of blocks available in the free block pool, the number of dead pages in a block, the block erase count, the instantaneous read or write rate, or the like.

The policy for determining the number of pages to be moved for each LBA write operation to the DA may be dependent on the number of dead pages in the block, where the lower the number of dead pages, the more pages are relocated for each write. The balance of relocations for each write, and the speed of background relocations from full blocks may be moderated by a wear-leveling policy so that frequently erased blocks are relocated less frequently. This may serve to promote wear leveling at the same time as garbage collecting.

When the pool of free blocks declines to a predetermined value, one or more blocks may be reclaimed, so that sufficient free space in the active blocks and the free blocks is available to keep up with a write speed specification. In addition, the amount of live data permitted in a full block may be limited so that, when the block is erased, the amount of time needed to relocate the remaining live data pages is compatible with a read rate of latency specification.

Where the module is part of a larger memory system, other volatile or non-volatile memory areas may also be provided for the temporary storage of program instructions and data for operation on by another computer, processor, or the like. Volatile RAM communication with, or part of, a memory module may be used as an intermediary storage between the NVS devices and any other storage medium, including NVS and may be a part of a memory module. The term memory module is a convenience for conceptualizing a group of NVS memory elements or packages, which may include associated volatile memory, and a computing device. It may also include a bus interface for communicating with other portions of a system. A module need not have all components physically resident on a single circuit board or substrate. Alternatively, more than one module may be resident on a single board or substrate.

Earlier, the number of live and dead pages expected when the block has been filled as discussed. However, since once all of the LBA address have been associated with a physical memory location through the mapping table (MT), and the memory system is in a quasi-steady state of being logically filled, except for housekeeping operations, the number of user write operations (except for metadata) is equal to the number of times the user has commanded a write operation, the result of which is a modification of the stored data for a logical page. Since this occurs by reading a page, modifying the data in a scratch memory, which may be non-volatile memory, and writing the data to a free memory page, the source page is now dead, and the destination page is now a live page, being deleted from the free page pool.

As each read or write operation to flash memory may be the read or write of a single page, there may be a temporal conflict between a housekeeping operation each garbage collection (or, the read of a page to enable the write of a modified page, or writing a modified data page) and a read operation initiated by the user.

In this example, there are occasions when the block is being erased. If a read request is directed to a chip or a block when it is being erased, then the read operation would be blocked for about 2 msec, unless the erase operation was interrupted. However, as described in U.S. Ser. No. 12/079,737, Memory Management System and Method, by the present inventor, filed on Mar. 26, 2018, and incorporated herein by reference, when memory is organized in a RAID configuration, the read blockages due to erasing blocks of FLASH memory in the memory modules may be scheduled so that a RAID group data may be reconstructed without all of the data, and the module read latency due to erasing a block may not be apparent to the user. Housekeeping operations may be effectively performed on other blocks during the erase period.

Where the data processing in this example is shown as being performed by a computer, the computer may be a memory controller or memory management client located on a circuit board that is a module containing the memory, or be connected to such a module by a bus, so that the data may be processed in another component of a larger system. The bus used for communication with other aspects of the system may be any of the varieties of bus architecture now known or which may be developed that is compatible with the product with which the memory system is designed to interface. Such busses may, for example but not by way of limitation, emulate the hardware and software interface characteristics of rotating magnetic disk storage systems, or be extensions or improvements thereon.

Figure 6:
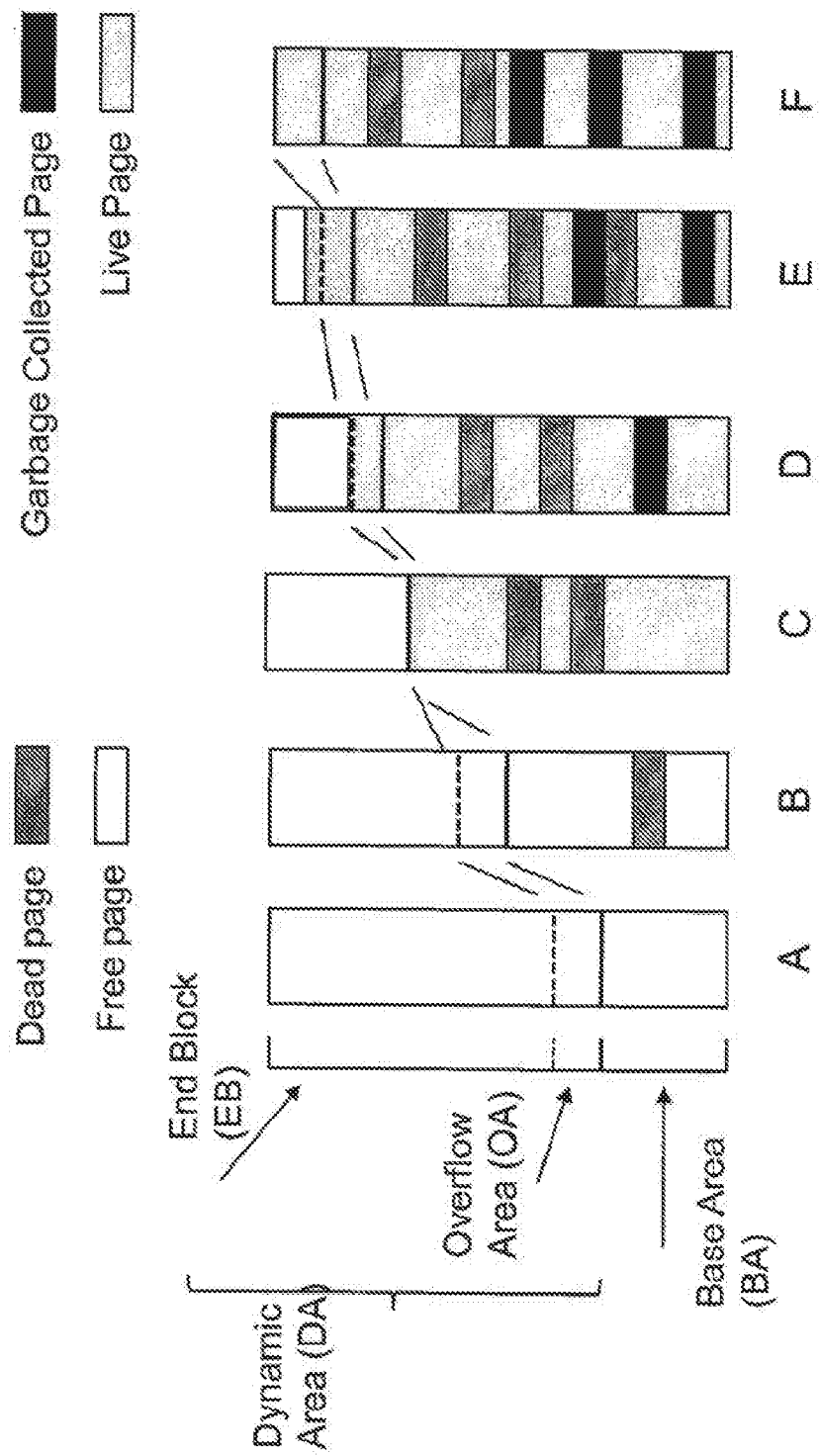
FIG. 6 conceptually illustrates a plurality of blocks where the base area and sub-areas of the dynamic area are managed to have different sizes.

The size of the BA and DA need not be fixed (as in FIG. 4), and need not be constant across all blocks, as shown in FIG. 6. Based on system load or occupancy or other performance metrics the size for the BA, DA=(OA+EB), and both OA and EB, may be varied for different blocks. For example a goal of having blocks in differing stages of utilization may be achieved as shown in FIG. 6 by having some of the blocks of a group of blocks A-F, represented by blocks A and B, with a BA of blocks A and B sized below the average value of BA over all the blocks A-F. The evolution of blocks between different degrees of utilization, for example to cause the distribution of data over a block of the blocks to conform to a given policy governing the distribution of the data, could be controlled as shown for block C whose OA is temporarily of size D, and cannot be written to. At another time, the size of the OA of block C could be made >0 and writing to block C may resume, and perhaps evolve into block D. In such a dynamic system, prior to a predetermined or adjustable level of utilization, a block may also have pages reserved for garbage collection, or wear leveling. Upon reaching a block fill level (in the case of block D), where the total of the data in live and dead blocks is BA+OA, garbage collection could begin on the block. In the case of block E, where the total is greater than BA+OA but less than BA+OA+EB, garbage collection could be performed at an accelerated rate. In the case of block F where the total is BA+OA+EB, the block has been completely filled and is now subject to reclamation for garbage collection purposes.

The BA and DA of a block of memory may have different sizes from that of this example, as a percentage of the available user memory, and the sizes used in the example, and the specific policies applied, are merely illustrative and not intended to be limiting. In an example, 80% of a block of physical memory may be allocated to the user data LBAs and the remaining 20% of the memory may be allocated to housekeeping (garbage collection) operations. A number of free blocks may be allocated to free block pool as a part of the management of the data transfers. The total number of write operations, including garbage collection, needed to accommodate a user-commanded write operation influences the efficiency of use of both the memory storage capacity and the operational time line. The latter may relate to the number of input/output (I/O) operations and the throughput in writing user data to memory.

The selection of values for BA and DA for each of the blocks may be, for example, a random variable uniformly distributed in a range of values about the target average value of the design. Adjustments to the values may be made based on monitoring the distribution of the percentage of live pages in a block. The free page level for a block may be compared with other blocks of a chip, a module, or a system and adjusted so as to achieve a confirming quasi-steady state distribution of percentage free pages for a plurality of blocks. The mix of user read and write operations, and the need for both garbage collection and wear leveling, results in a dynamic load situation, and adjustment of the BA and DA, and the garbage collection protocols in response to the load may be used to control variability in the response times as experienced by the user.

The data to be stored in the memory may be said to be comprised of S pages of data, where S×page_size (KB) is the total amount of all user data to be stored in the memory. Each of the LBA pages of data may be associated with one page of physical memory. The relationship between each LBA and a PBA is found in the MT. The specific PBA associated with the LBA may be changed wherever the data is physically moved in the memory for any reason. However the total number of pages of data S is neither increased nor decreased in this process. That is, the size of the logical data array is unchanged.

If the total amount of physical memory of a memory block is PM and the memory is allocated as a sum of user memory U and housekeeping memory H: PM=U+H. Here, the term housekeeping memory is meant to identify the amount of memory in a block that remains available when the amount of user memory U is filled with user data. One may interpret the memory allocations of FIG. 4 as having the user memory U equal to the base area BA, and the dynamic area DA being a component of tie housekeeping data. That is, only a BA number of sectors of the block are available for user data. H=PM−U. Moreover, H may include any memory reserved for actual housekeeping information that is not part of either BA or DA. As before, however, the concept that there is "user" memory and "housekeeping" memory is taken in the aggregate. That is, each sector of a block, for example, may hold either user data or housekeeping data. The nature of the data in each sector may be identified through a mapping table, whether the mapping table performs this identification to the byte, sector, page, or block level is a matter of design choice. Generally data is initially written to a free block sequentially by physical sector location due to the constraints on current NAND FLASH technology; however, the type of data written to each sector, for example, may be determined by the operating software of the memory system or the data management system. Therefore U and H may be considered to refer to the amount of type of data in pages of a block, and not necessarily to a physical page location in the block.

When the LBAs are first allocated to PBAs, all of the page sin the U portion of memory may be allocated to LBAs. In a naively managed memory system, when user data is subsequently modified by writing the modified data to free pages, pages in the H portion of the memory are used until the PM of a block is filled up with live and dead pages; there are no more free pages. A corresponding number of pages H in the U portion of the memory will have been marked as dead, as the data stored therein has been modified and moved to a location in the H portion of the memory (as well as additional pages that have been moved as part of the housekeeping). So, when the block of physical memory PM is filled, there are H dead memory pages in the U portion of the memory. Since there is no further space for writing to free pages, the dead pages will need to be reclaimed by erasing the block. Prior to doing this, any remaining five pages in the PM, including the data in the H portion of the memory need to be relocated to another memory location so that valid data is not erased.

This description is a simplification for purposes of explanation and is not intended to be limiting. In a memory system, data that is being modified may be written to a different free page of same block or to another block. So, for example, data that has been modified once may be moved to the H category of the same block, or the U or H category of another block. Thus a full block may also have less than H live pages, if greater than PM-U pages have been modified prior to filing of the block.

Write amplification is the number of write operations performed to the NAND flash system for a single write request from the user application. The amount of write amplification may be related to the percentage of available memory that is allocated to the user, with respect to the total amount of memory used to service the user needs, including all housekeeping functions, and may defective memory that is not available for any purpose.

For example, consider a memory block a "source" block) having 64 pages divided as U=32 pages and H–32 pages. That is, the user appears to have 50% of the physical memory available for use. Initially, when the source block has been filled, all of the pages in the U memory area of the source will have been marked as dead, and have been moved into the H memory area. When the block is reclaimed by erasing. In order to free up the dead memory of the full block, the 32 live pages in memory area H may be relocated to another memory block (a "destination" block). The source memory block may then be erased and all of the source block PM becomes once again available for writing operation. In the process, the destination memory block has the memory area U filled with live data from the source block. This may have been the situation that obtained at the beginning of process, except that the data is now stored in a different memory block. Of course once the block has been erased, the user data that was in the block could have been restored thereto, having been stored in either RAM or FLASH during the erasing process.

The writing of data described herein is again for the purposes of illustration. The same result would have been obtained if a single LBA was modified continuously so that the H area was filled with successive versions of the data in the LBA until the block was filled. The same number of five and dead sectors would have resulted by the time the block was filled.

The total number of write operations W may be the sum of the user write (modify data) operations UW, and the number of data transfer DT writes needed to clear all of the remaining live data from the source memory block prior to erasure. W=UW+DT. In this case UR was 32 and DT was also 32 as 50% of the physical memory in a block was allocated to each of U and H. In general, the number of user writes UW prior to filling the memory block would be H, which is the amount of initially free memory H at the beginning of the process. When the block has been filled up, H pages have been moved from the user memory U, and the number of live pages remaining is (U−H), excluding housekeeping data moves. This means that the number of data transfers DT is H+(U−H)=U We can express a write amplification factor A as the ratio of the total number of writes W to the number of writes needed to fill up the block. So A=W/H=(UW+DT)/H =(H+U/H=1+U/H. In the limit, where only one of the pages of the bbock is allocated to user data, the average amplification factor A=1+1/63≈1, while the situation which would obtain when all but one of the pages was allocated to user data would be A=1+63/1=64.

Figure 7:
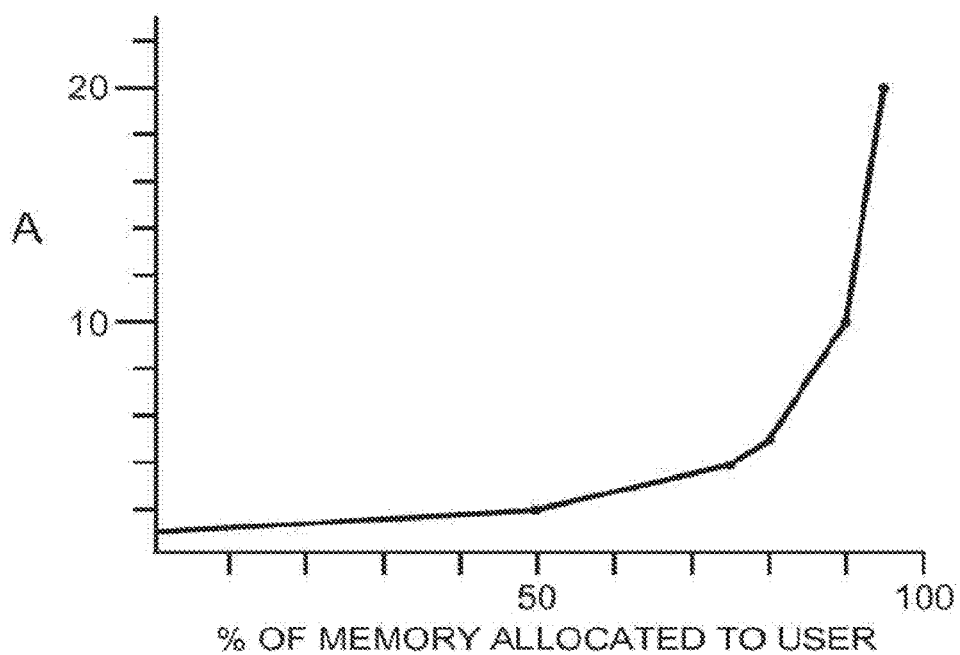
FIG. 7 illustrates the dependence of the write amplification factor on the percentage of a block allocated to the user.

Thus, the write amplification factor A is seen to be a function of the proportion of the actual physical memory that is allocated to the user data. The case described in this example had U=50% and H=50%, or H=32 and U=32 for A=2+32/32=2. In the first example, U=80% (51) and H=20% (13) so that A=1+51/13, or approximately 4. This function is shown in FIG. 7 and may serve to guide the design of a system where the percentage of the memory allocated to housekeeping memory housekeeping memory H may be traded against, for example, the write amplification factor A and the cost of the physical memory. Since the write amplification factor A has implication for both writing speed and wear out (the number of erases), each of these factors may enter into the design, depending on the application. For a fixed writing rate, the number of erases is proportional to the write amplification factor. So allocating too little memory may result in both excessive housekeeping overhead and faster wear out. The same physical memory may be configured at an initialization time to have a particular allocation of U and H, and thus the characteristics may be "tuned" to particular user needs.

It should be apparent that this example has been simplified by focusing on a single memory block, whereas a memory chip may have, for example, 4096 blocks and a memory module may have a plurality of chips, which may be organized so that a LBA may be written to any of the chips of the module having a free page. So, when a write operation is needed to either modify the data stored for a LBA or to relocate data for the purposes of marking all of the page sin a memory block as dead so that the memory block may be marked for erase, or erased, the page being written or relocated may be moved to the lowest free page in any block, in any selected chip of the module. the choice of a block to which the write operation (where write here is meant to be understood as including data -modify writes and data relocation writes) is to be performed may be the subject of a system policy. For example, successive writes may be organized so that they are distributed to the chips so as to limit the time that any chip is busy performing a write. Where a module is used in a naïve mode, this may mean that the maximum blockage of a read operation would be a write time interval. Erase operations may be similarly treated, or hidden, using a RAID architecture, as previously mentioned herein.

The choice of destination for each written page may be made in accordance with a wide variety of system policies, which may also include the use of predictors of LBA behavior that may be learned by the memory controller, so that groups of pages may be written to contiguous areas, or dispersed, as needed. Distribution of the writes over the internal memory busses may contribute to a high read and write rate. At present, the relatively slow read and write times of FLASH memory when compared with, for example, DRAM, makes sophisticated memory management policies feasible, as the computational overhead is small when compared with the current NAND FLASH memory process execution times. When allocating a write operation to a block, consideration may be given to the erase count of each block and to each chip, so that the garbage collection process may also facilitate the wear leveling process.

The write amplification factor A measures the number of actual write operations associated with any write action (including the writes associated with relocation of data in a garbage collection operation, but not including, at least explicitly, wear leveling data relocation operations). As such, the user experience in writing a random page data would be better when A=1 and may decrease as the actual number of writes required for each user page write increased. Thus, when the highest continuous random write speed is estimated, the speed may be approximately proportional to the inverse of the write amplification factor A.

The operation of the memory at the block level of a chip may be visualized by reference to FIG. 5. Here, the combination of blocks 0 thru N has enough pages to accommodate all of the pages of the LBA, which represents the portion of the memory system allocated to the user. When the system has been initialized, and no data has been as yet stored in the memory (state 1), all of the blocks are free, and there exists an additional pool of free blocks. Three such pool blocks are shown as being representative.

As data is written to the memory, which may include modification of data already written to the memory, some of the blocks become active, as pages of data are written, corresponding to LBAs (state 2). The stubs of each of the free pages in a block is adjusted accordingly. The status would first change from free to live, and when the data is modified and moved to new address, the old physical address would be changed to dead, so that the data of any valid LBA is associated with only one physical page in the memory.

As operation of the system proceeds, some of the blocks become filled with a combination of live and dead pages; that is designated M in FIG. 5 (state 3). This may represent a situation where actual data has been written to substantially all of the LBAs, and there have been some data modify operations as well. Garbage collection may have been performed internally to the individual blocks so that the percentage of live data pages has been reduced. If there are no live pages remaining in block, the block may be marked X, indicating that it may be erased opportunistically as needed or to replenish the free blocks in the free block pool. Alternatively, if there are no blocks marked X, and free page space is needed, one or more of the blocks marked M may be prepared for erasure by moving the remaining live pages to another block so that the block may be erased and a free block created. The choice of a partially dead block on which this operation may be performed may be a policy which, for example may take into consideration the percentage of the pages which are dead, the number of previous block erasures, the data type, or the like (state 4). When a block has been reclaimed (erased), it may be added to the block pool so as to keep the block pool at or above a minimum size. The numbering and location of the blocks is meant to be conceptual, and may be considered as a logical notation, so that may block on the chip may be either in the user data area or the free block pool.

The number of blocks in the pool of free blocks is a design choice, and depends on the amount of over-provisioning of memory in a module with respect to the amount of memory made available to the user.

As a write operation may be made to any block having a free page, and a module may have a plurality of chips, the interference between read and write operations may be mitigated by distributing the data pages amongst the totality of available blocks, taking advantage of the principles of spatial and temporal locality. In NAND FLASH, the write operation may be performed to a memory location one greater than the current value of a pointer, in odder to avoid leaving unwritten memory locations interspersed with valid data. The pointer is incremented with each write operation so as to point to the lowest block in memory that is currently a free memory location.

Figure 8:
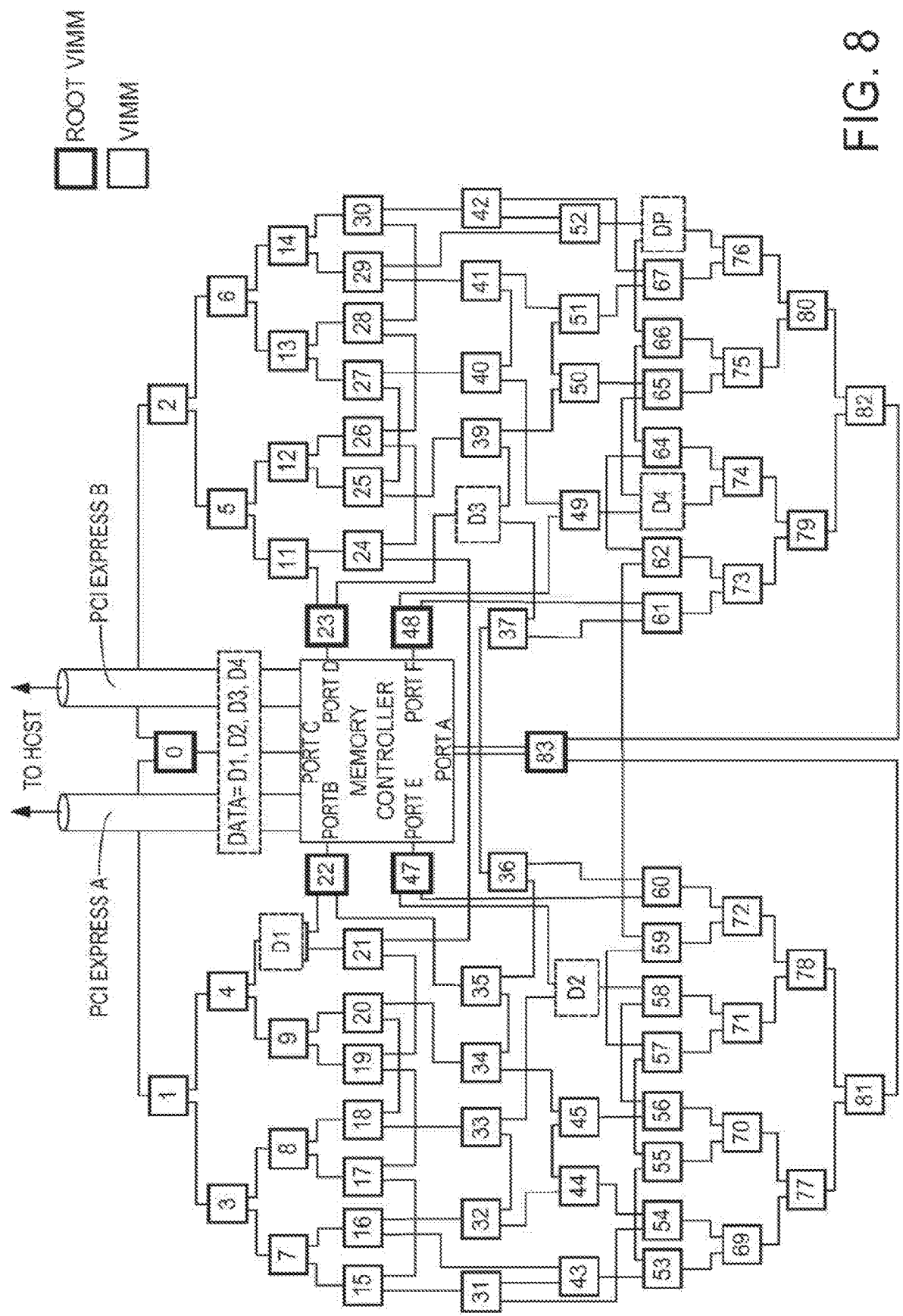
FIG. 8 illustrates the organization of memory modules in a memory system compatible with RAID.
Figure 10A:
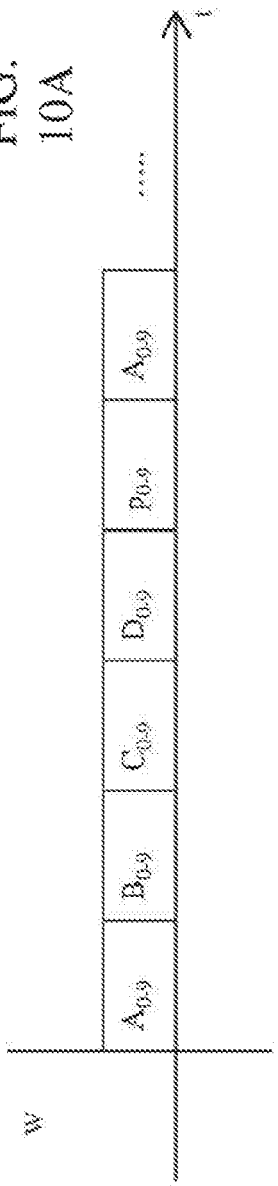
FIG. 10A shows the time sequence of write operations for a RAID stripe; and, FIG. 10B shows the relationship of write and read operations for sequential time intervals of FIG. 10A.

In another example, shown in FIG. 8, the memory system may be organized as an array of modules connected by a bus system. A bus-connected array of memory modules has been described in U.S. Ser. No. 11/405,083, Interconnection System, filed on Apr. 17, 2006, which is commonly owned and which is incorporated herein by reference. A module, which may be the module of FIG. 1 may have the volatile storage 20 and the non-volatile storage 30, and may have a bus interface or local memory controller 10.

Memory systems may have additional protection against data loss by the use of RAID data storage techniques, as described in U.S. Ser. No. 12/079,737, Memory Management System and Method, filed on Mar. 26, 2008, which is commonly owned, and is incorporated herein by reference.

In an example, a memory system was described including, including a plurality of memory modules, where each module may have a capability for writing and leading data. M bytes of data may be stored in group of N memory modules of the plurality of memory modules. An error connecting code for the M bytes of data store din the group of N memory modules may be stored in another one of memory module of the plurality of modules, or distributed amongst the modules. When the stored data is retrieved from any N−1 modules of the group of N memory modules and includes the error connecting data, the M bytes of data stored in the group of N memory modules may be recovered.

In a particular embodiment of the RAID concept data may be stored on different memory modules, or memory circuits, so as to realize a RAID 5 organization with 4 data modules and 1 parity module. Each LBA may be divided into a group of four smaller LBA ranges (for example, sectors) and stored on four different memory modules. A parity value for each group of LBA ranges is computed and stored on a fifth memory module. Such an organization of the data storage permits the recovery of data when a memory module fails.

However, as disclosed, the memory system may be configured to operate such that only 4 of the 5 modules in a RAID group need to have reported data that has been read in response to a read request. The data for the late module may recovered, if needed, by using the data in the modules that have already reported data. The late module may be performing an erase or a write operation. In particular, the modules in a RAID group may be configured such that only one module is enabled to perform an erase operation at a particular epoch. So, four modules of the five modules will be in a condition where read operations may be performed promptly, and where the data of the fifth module is data and not parity information, the purity information, being promptly returned from one of the modules, not in the erase state at the time, is used to reconstruct the data. Alternatively, the first four modules may return data, and not the purity information. In this circumstance, the parity data is not needed to recover the data.

Depending on the system configuration and the operational policy employed, write operations, which cause smaller delays than erase operations, may be permitted to occur during read epochs of a module, may be restricted to the erase epoch, or be governed by the dynamic write and read data loads and the desired performance characteristics of the system. Physical or logical portions of the memory system may be subject to different operational policies.

FIG. 5 shows an example of the management of a two dimensional array of data. When the RAID-5 system was operated such that only one of the live memory modules. Al-Ap was permitted to be in a write mode at any time, the four remaining of the memory modules promptly return data so that the latency for a read operation is not compromised, for a combined write and erase load, for this configuration, of 20 percent or less. This situation contrasts with a system not having this constraint on the sequence of write or erase operations, where the interference between read and write operations begins at a very low write load. Such interference is often observed as spikes in the latency time to respond to a particular read request. The number of data pages represented by a parity page is a matter of design choice.

In order to avoid unnecessary repetition of the words write and erase, the remaining discussion will use the word erase to describe the epoch or the operation of erasing a block of memory. Write operations may be performed in the erase epoch when erase operations are not being performed. Write operations may also be performed during read epochs if permitted by the operational policy in effect at the time write operation is pending. Since a write operation may be completed in a shorter time than an erase operation, for currently available FLASH memory circuits, a plurality of write operations may be performed during the time that a single erase operation would performed. Alternatively, if an erase operation is not scheduled, or both the pending erase and write operations are performed before completion of an erase epoch, the memory management policy may place the module back into a read state, or both place the module in a read state, and enable another module to begin the erase state early.

The memory data in FIG. 5 is shown as organized in stripes, and a $0^{th}$ stripe 410 comprises memory modules 310 (or, for example, chips) A0, B0 C0, D0 and P0, arranged in columns A, B, C, D, and P respectively. The remaining stripes of the system, 2-9, are similar, so as to form a memory system of 50 modules.

The physical and logical arrangement of the modules or addresses may be any such arrangement where the memory where the data is stored may be accessed in the manner described; that is, that less than all of the modules return data promptly, but that the data returned from the memory system permits the recovery of data that may be delayed, prior to the receipt of the delayed or absent data.

For purposes of explanation, a timing circuit on each memory module is considered to be initialized at the same time as on the other memory circuits, and marks time in intervals of 1 msec, which corresponds to time sufficient to complete an erase operation. A longer time interval may permit the performance of multiple erase operations or erase and write operations.

Erase operations are performed one column at a time in successive time intervals. FIG. 6A shows columns 514 of the memory modules being enabled for writing operation in successive time intervals $t_1, t_2, \ldots t_{10}$, and which repeat, modulo 10. As shown in FIG. 6B, where a time history of stripe 0 is shown, it may be seen that a single memory module is enabled for a write operation at any time period. This satisfies the criterion that 4 of the 5 memory modules in a stripe be available for a read operation at any time. This results in a latency dependent only of the read latency with no write-load influence, until the system experiences a substantial write load; in this case 20 percent of the time line.

The allocation of time periods in which memory modules may perform the erase operations may be done in any number of ways, for example, allocating time periods with respect to a global reference time so that modules operate with local determination of the period of time, by the transmission of a control messages from a global controller, by token passing from module-to-module, by command buses or wires between the modules, or the like. A combination of approaches may be used; for example, in a system where when the desired programming data rate was greater than could be satisfied by having a single column of the RAID group performing erasing at one time, and if there were multiple RAID groups, then one module of some or all RAID groups may be erasing while, at the same time for some number of RAID groups, more than one or all modules are erasing as shown in FIG. 5. In each a system, for example, the column which may perform an erase or program may be determined by a fixed allocation of time periods, while the determination of when an entire row or RAID group may perform an erase operation may be determined by one of the modules in a RAID group sending a command to the next RAID group indicating the next RAID group can start, a form of token passing, and the module may have determined that all modules in its RAID group had completed their erase operation by use of a second token passing scheme, or a pull down write that all modules hold until they are done, or a command bus the other modules use to indicate they are done, or a similar method or configuration.

Where the term memory module is used, the memory module may be, for example, a pluggable circuit card with plurality of memory circuits thereon, or the memory module may be each one of, or a group of, memory circuits on the circuit card, or what is known as a Solid State Disk (SSD). SSDs come in many form factors, from individual cards to packages that may conform to the size and shape of a mechanical disk drive. The scale size of the logical address range that may be associated with a memory module or storage location is not intended to be limited by the description herein, and a memory module may thus encompass both larger and smaller data storage devices or data structures.

Where the FLASH memory is organized into modules of memory and a module of memory is assigned to particular RAID stripe, generally some modules are in a read-enabled state and some modules are in an erase-enabled state at the same time. Which module are in a specific state at a particular time that varies as the modules are sequenced through the read and erase states, while maintaining the property that the data can be reconstructed from using data that is returned from the modules in the read state. Again, it should be emphasized that the actual memory organization may differ from that described, so long as the data recovery property is maintained.

In a large memory system, not all of the RAID groups may have the same data read or erase loads. Some locations may be more heavily used than others, and this may be dependent on the evolution of the processing load and type supported by the memory system. At times, all of the needed erase operations may have already been completed when the memory module is schedule for a write state. Here, a write state includes the erase operation; however, erase and write states may be scheduled separately. During the periods of the write state where no erase or white operations are pending, the FLASH memory busses are effectively idle. Similarly both local computational resources and scratch memory may also be lightly loaded.

The time period where a module or circuit of memory is in the write or erase state is well suited for performing local operations, such as housekeeping, including garbage collection and wear leveling, particularly where erase operations are used to recover a block of memory. These operations are more often performed on a bank of FLASH memory and may not extend across chip boundaries, although such a span is not precluded. In any event, when a chip of a module is not engaged in an erase operation, read and write operations may also be performed for housekeeping purposes (wear leveling, garbage collection and the like), and the time interval where such operations are performed may not affect the response time of the RAID array, since the operations occur during a period of time where data is not expected to be available from the memory module, and since the module itself is in an erase state from a user perspective.

By performing the pending erase operations for garbage collection during the erase epoch, the erase load for garbage collection is substituted in the erase interval of the RAID group. Moreover, read operations, for any purpose, may have been performed at any time since the preceding erase epoch and stored in non-volatile memory. Such data may be written to new locations promptly, or deferred for writing during the erase epoch, where writes may be performed to other chips in a package that are not scheduled for an erase operation. So, a plurality of pending write operations associated with either the user storage of data, or the housekeeping data previously read for relocation may be performed, thus subsuming the associate write operations in the erase epoch and being hidden to the user by the RAID reconstruction process as previously described.

While a particular schema for garbage collection has been described in detail in this application, a variety of garbage collection algorithms may be used, as all such algorithms need to erase at least a block of data locations so as to reclaim the block for writing of data. The size of a block to be erased is dependent on the specific type of FLASH memory used.

Since the on-module read and write operations can be performed during the erase epoch with almost full use of the read and write bandwidths of the FLASH memory circuits on the module, this may permit almost 20 percent of the time line to be used for housekeeping operations in the present example, without a noticeable effect on user system performance, since erase, write and read operations are not perceived by the user at a memory system level.

In any event, performing the pending garbage collection operations during the erase interval at least reduces the number of housekeeping operations which may remain to be performed during periods when the user is accessing data in the RAID group. As housekeeping operations may generally be temporarily suspended in whole or in part during high system transient loads, the hidden housekeeping operations may be scheduled during lulls in user activity.

The scheduling of housekeeping erase operations during a scheduled erase epoch effectively subsumes, or hides, the erase operations in a scheduled epoch where the user may not need immediate access to the particular chip or module where data in the RAID group is stored. Thus a memory system may be configured so as to subsume housekeeping operations in the periods where the user need not immediately access data in the particular memory circuit in order to experience sustained performance at high data rates, for both reading and writing.

It is therefore intended that the foregoing detailed description be regarded as illustrative rather than limiting, and that it be understood that it is the following claims, including all equivalents, that are intended to define the spirit and scope of this invention.

What is claimed is:

1. A non-volatile data storage system, comprising:
a plurality of memory blocks, wherein one or more of the memory blocks have pages forming a first group of memory locations (BA) and a second group of memory locations (DA); and
a hardware processor configurable to:
write data into the pages of the BA changing the pages in the BA from a free page to a live page;
increment a write counter or pointer (WP) for each write operation to the BA causing the WP to count or point to a next free page in the BA;
when the WP reaches an end of the BA, continue to write data into pages of the DA changing the pages in the DA from free pages to live pages;
increment the WP for each write operation to the DA causing the WP to point to a next free page in the DA; and
for each write operation to the DA, also move a live page of data out of the BA to another memory page location changing the live page of data in the BA to a dead page of data to reduce a number of live pages in the BA that have to be moved prior to scheduling an erase operation for the memory block.

2. The data storage system of claim 1, wherein the processor is further configurable to move live pages of data from the BA to free storage locations in other memory blocks based on erase frequencies.

3. The data storage system of claim 1, wherein the processor is further configurable to move live pages of data from the BA to free storage locations in other memory blocks based on a number of times the data in the BA has been programmed.

4. The data storage system of claim 1, wherein the processor is further configurable to move live pages of data from the BA to free storage locations in other memory blocks based on a spatial locality of the BA.

5. The data storage system of claim 1, wherein the processor is further configurable to move live pages of data from the BA to free storage locations in other memory blocks based on a temporal locality of the BA.

6. A data storage system, comprising:
a memory block having pages forming a first group of memory locations (BA) and a second group of memory locations (DA), wherein: a status of each page of the BA and DA is characterized as one of live, dead, or free, and a write operation to a free page in the BA or DA changes the status of the free page to live; and
a processor is configurable to:
write data into the pages of the BA changing the pages in the BA from a free page to a live page;
increment a write counter or pointer (WP) for each write operation to the BA causing the WP to count or point to a next free page in the BA;
when the WP reaches an end of the BA, continue to write data into pages of the DA changing the pages in the DA from free pages to live pages;
increment the WP for each write operation to the DA causing the WP to point to a next free page in the DA; and
for each write operation to the DA, also move a live page of data out of the BA to another memory page location changing the live page of data in the BA to a dead page of data to reduce a number of live pages in the BA that have to be moved prior to scheduling an erase operation for the memory block.

7. The data storage system of claim 6, wherein the DA includes a first set of pages forming an overflow area (OA) and a second set of pages forming an end buffer (EB), wherein the processor is further configurable to:
when the WP reaches the end of the BA, continue to write data sequentially into pages in the OA and each next sequential page in the OA, changing the page in the OA from a free page to a live page;
increment the WP for each write operation to the OA causing the WP to point to a next free page in the OA;
for each write operation to the OA, move a live page of data from the BA to another memory page location changing the live page of data in the BA to a dead page of data;
when the WP reaches the end of the OA, continue to write data to the EB and each next page in the EB, changing the page in the EB from a free page to a live page; and
for each write operation to the EB, move multiple live pages of data from the BA to another memory page location to increase a rate that the live pages of data in the BA are changed to dead pages of data.

8. One or more non-transitory computer-readable media (NTCRM) comprising instructions for operating a non-volatile data storage system, the data storage system comprising a plurality of memory blocks, wherein one or more of the memory blocks have pages forming a first group of memory locations (BA) and a second group of memory locations (DA), and wherein execution of the instructions is to cause a processor of the non-volatile data storage system to:
write data into the pages of the BA changing the pages in the BA from a free page to a live page;
increment a write counter or pointer (WP) for each write operation to the BA causing the WP to count or point to a next free page in the BA;
when the WP reaches the end of the BA, continue to write data into pages of the DA changing the pages in the DA from free pages to live pages;
increment the WP for each write operation to the DA causing the WP to point to a next free page in the DA; and
for each write operation to the DA, also move a live page of data out of the BA to another memory page location changing the live page of data in the BA to a dead page of data to reduce a number of live pages in the BA that have to be moved prior to scheduling an erase operation for the memory block.

9. The one or more NTCRM of claim 8, wherein execution of the instructions is further to cause the processor to move live pages of data from the BA to free storage locations in other memory blocks based on erase frequencies.

10. The one or more NTCRM of claim 8, wherein execution of the instructions is further to cause the processor to move live pages of data from the BA to free storage locations in other memory blocks based on a number of times the data in the BA has been programmed.

11. The one or more NTCRM of claim 8, wherein execution of the instructions is further to cause the processor to move live pages of data from the BA to free storage locations in other memory blocks based on a spatial locality of the BA.

12. The one or more NTCRM of claim 8, wherein execution of the instructions is further to cause the processor to move live pages of data from the BA to free storage locations in other memory blocks based on a temporal locality of the BA.

13. The one or more NTCRM of claim 8, wherein the DA includes a first set of pages forming an overflow area (OA) and a second set of pages forming an end buffer (EB), wherein execution of the instructions is further to cause the processor to:
when the WP reaches the end of the BA, continue to write data sequentially into pages in the OA and each next sequential page in the OA, changing the page in the OA from a free page to a live page;
increment the WP for each write operation to the OA causing the WP to point to a next free page in the OA;
for each write operation to the OA, move a live page of data from the BA to another memory page location changing the live page of data in the BA to a dead page of data;
when the WP reaches the end of the OA, continue to write data to the EB and each next page in the EB, changing the page in the EB from a free page to a live page; and
for each write operation to the EB, move multiple live pages of data from the BA to another memory page location to increase a rate that the live pages of data in the BA are changed to dead pages of data.

\* \* \* \* \*